(12) United States Patent
Takahata et al.

(10) Patent No.: US 11,316,181 B2
(45) Date of Patent: Apr. 26, 2022

(54) FUEL CELL UNIT STRUCTURE AND METHOD OF CONTROLLING FUEL CELL UNIT STRUCTURE

(71) Applicant: NISSAN MOTOR CO., LTD., Yokohama (JP)

(72) Inventors: Kazuhiro Takahata, Kanagawa (JP); Motoki Yaginuma, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 260 days.

(21) Appl. No.: 16/637,001

(22) PCT Filed: Aug. 10, 2017

(86) PCT No.: PCT/JP2017/029207
§ 371 (c)(1),
(2) Date: Feb. 6, 2020

(87) PCT Pub. No.: WO2019/030919
PCT Pub. Date: Feb. 14, 2019

(65) Prior Publication Data
US 2020/0203740 A1    Jun. 25, 2020

(51) Int. Cl.
*H01M 8/04746*    (2016.01)
*H01M 8/04082*    (2016.01)

(52) U.S. Cl.
CPC ... *H01M 8/04753* (2013.01); *H01M 8/04201* (2013.01)

(58) Field of Classification Search
CPC . H01M 2008/1095; H01M 2008/1293; H01M 8/0258; H01M 8/04201; H01M 8/04753; H01M 8/2418; H01M 8/2428; H01M 8/2483
See application file for complete search history.

(56) References Cited

U.S. PATENT DOCUMENTS

| 6,528,196 B1 | 3/2003 | Fujii et al. |
| 2003/0096147 A1* | 5/2003 | Badding ............. H01M 8/2484 429/432 |

(Continued)

FOREIGN PATENT DOCUMENTS

| JP | 7-192739 A | 7/1995 |
| JP | 2001-052723 A | 2/2001 |

(Continued)

*Primary Examiner* — Adam A Arciero
(74) *Attorney, Agent, or Firm* — Foley & Lardner LLP

(57) ABSTRACT

A fuel cell unit structure includes: power generation cells; separators; a flow passage portion formed between the separators and including flow passages configured to supply gas to the power generation cells; gas flow-in ports configured to allow the gas to flow into the flow passage portion; gas flow-out ports configured to allow the gas to flow out from the flow passage portion; and an adjustment portion configured to adjust an amount of the gas flowing through the flow passages. The adjustment portion includes a first auxiliary flow passage provided between the power generation cells arranged to be opposed to each other on a same plane with a gas flow-in port of the gas flow-in ports being located on an extended line of an extending direction of the first auxiliary flow passage.

11 Claims, 27 Drawing Sheets

(56) References Cited

U.S. PATENT DOCUMENTS

| | | | |
|---|---|---|---|
| 2004/0265666 A1* | 12/2004 | Weil | H01M 8/0273 |
| | | | 429/456 |
| 2010/0248065 A1* | 9/2010 | Yamanis | H01M 8/2432 |
| | | | 429/457 |
| 2015/0340723 A1 | 11/2015 | Yang et al. | |

FOREIGN PATENT DOCUMENTS

| | | |
|---|---|---|
| JP | 2002-260688 A | 9/2002 |
| JP | 2014-086263 A | 5/2014 |
| JP | 2015-109225 A | 6/2015 |
| JP | 2016/506048 A | 2/2016 |

* cited by examiner

FUEL CELL UNIT STRUCTURE AND METHOD OF CONTROLLING FUEL CELL UNIT STRUCTURE

TECHNICAL FIELD

The present invention relates to a fuel cell unit structure and a method of controlling a fuel cell unit structure.

BACKGROUND ART

Conventionally, a fuel cell generates power by supplying gas to a power generation cell formed by sandwiching an electrolyte between a fuel electrode and an oxidant electrode. In the fuel cell, it is desirable to evenly supply gas to the power generation cell to improve power generation efficiency. In this regard, there is known a technique in which the power generation cell is provided with gas flow-in ports and flow-out ports offset from each other, so that the gas is supplied to the entire surface of the power generation cell (see, for example, Patent Document 1).

CITATION LIST

Patent Literature

Patent Literature 1: Japanese Patent Application Publication No. 2015-109225

SUMMARY OF INVENTION

Technical Problem

In the configuration described in Patent Document 1, although the gas is supplied to the entire surface of the power generation cell, it is difficult to, for example, reduce variation among a flow rate of gas flowing through a center portion of the power generation cell and flows of gas flowing through end portions of the power generation cell. Accordingly, it is difficult to sufficiently improve power generation efficiency.

An object of the present invention is to provide a fuel cell unit structure and a method of controlling a fuel cell which can sufficiently improve power generation efficiency.

Solution to Problem

A fuel cell unit structure according to the present invention for achieving the above object includes: power generation cells; separators; a flow passage portion; gas flow-in ports; gas flow-out ports; and an adjustment portion. Each of the power generation cells includes an electrolyte sandwiched between a fuel electrode and an oxidant electrode and is configured to generate power by using supplied gas. Each of the separators is provided between the power generation cell and the power generation cell and configured to isolate the adjacent power generation cells from each other. The flow passage portion is formed between the separator and the separator and includes flow passages configured to supply the gas to the power generation cells. The gas flow-in ports are configured to allow the gas to flow into the flow passage portion. The gas flow-out ports are configured to allow the gas to flow out from the flow passage portion. The adjustment portion is configured to adjust an amount of the gas flowing through the flow passages. A number of the gas flow-in ports is different from a number of the gas flow-out ports. The adjustment portion includes a first auxiliary flow passage formed between opposed surfaces of the power generation cells arranged such that the power generation cells are opposed to each other on a same plane. The adjustment portion is configured to reduce variation in a flow among the flow passages by adjusting a pressure loss in the flow passage portion formed between the gas flow-in ports or between the gas flow-out ports.

A method of controlling a fuel cell unit structure according to the present invention for achieving the above object is a method of controlling the fuel cell unit structure which generates power by supplying gas to power generation cells sandwiched between separators while supplying the gas from a gas flow-in port to a flow passage portion formed in the separators and discharging the gas from a gas flow-out port. A number of the gas flow-in ports is different from a number of the gas flow-out ports. The A method of controlling the fuel cell unit structure includes: dividing in a same plane of the power generation cells a flow of the gas supplied from the gas flow-in port into at least two flows including a main flow flowing through the flow passage portion in the separators and an auxiliary flow flowing between the power generation cells arranged such that the power generation cells are opposed to each other on the same plane; and adjusting a pressure loss of the gas in the auxiliary flow to cause the gas to be evenly distributed in the same plane in the main flow.

BRIEF DESCRIPTION OF DRAWINGS

FIG. 11 is a cross-sectional view illustrating the metal-supported cell assembly and the like.

DESCRIPTION OF EMBODIMENTS

Figure 1:
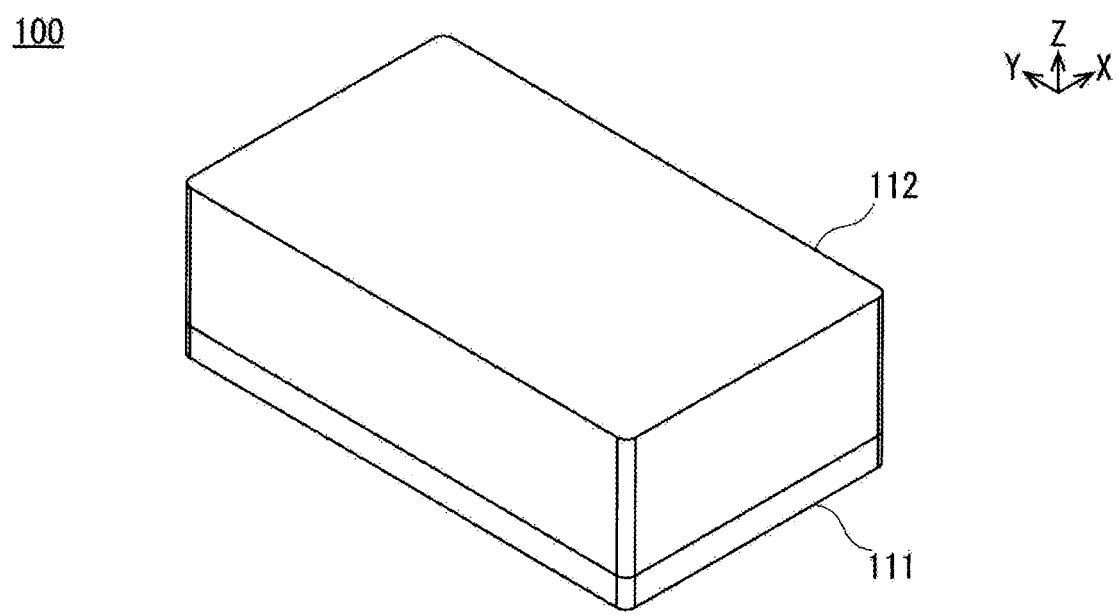
FIG. 1 is a perspective view illustrating a fuel cell of a first embodiment.

First to fifth embodiments of the present invention are described below with reference to the attached drawings. In the drawings, the same members are denoted by the same reference numerals and overlapping description is omitted. In the drawings, the sizes and the proportions of the members may be exaggerated to facilitate the understanding of the first to fifth embodiments and be different from the actual sizes and proportions.

Directions in the members forming the fuel cell are described by using arrows denoted by X, Y, and Z in the drawings. The direction of the arrow denoted by X indicates a short-side direction X of the fuel cell. The direction of the arrow denoted by Y indicates a long-side direction Y of the fuel cell. The direction of the arrow denoted by Z indicates a stacking direction Z of the fuel cell.

First Embodiment (Configuration of Fuel Cell 100)

Figure 2:
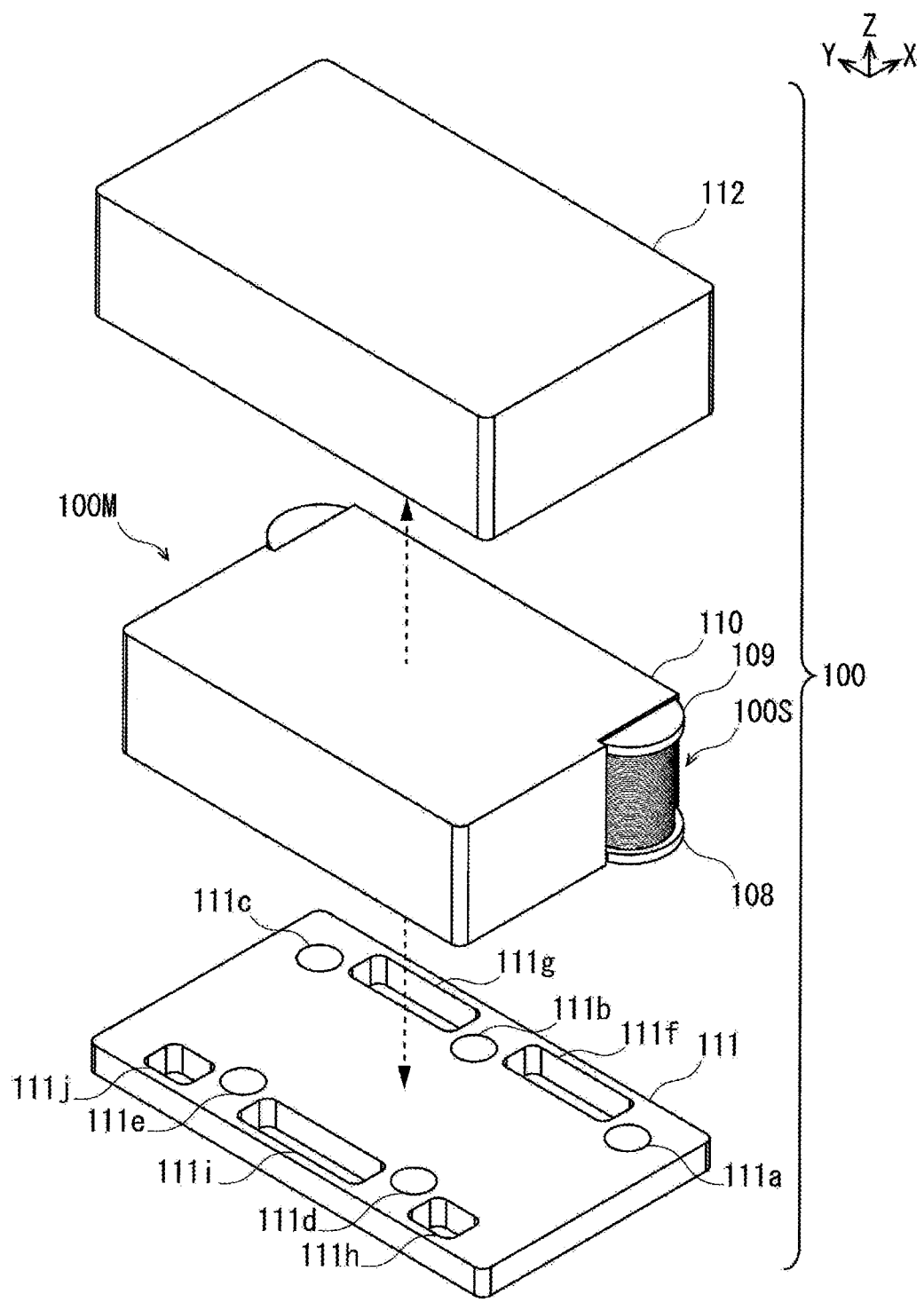
FIG. 2 is a perspective view illustrating a state where the fuel cell of FIG. 1 is disassembled into a cover, a cell stack assembly, and an external manifold.
Figure 3:
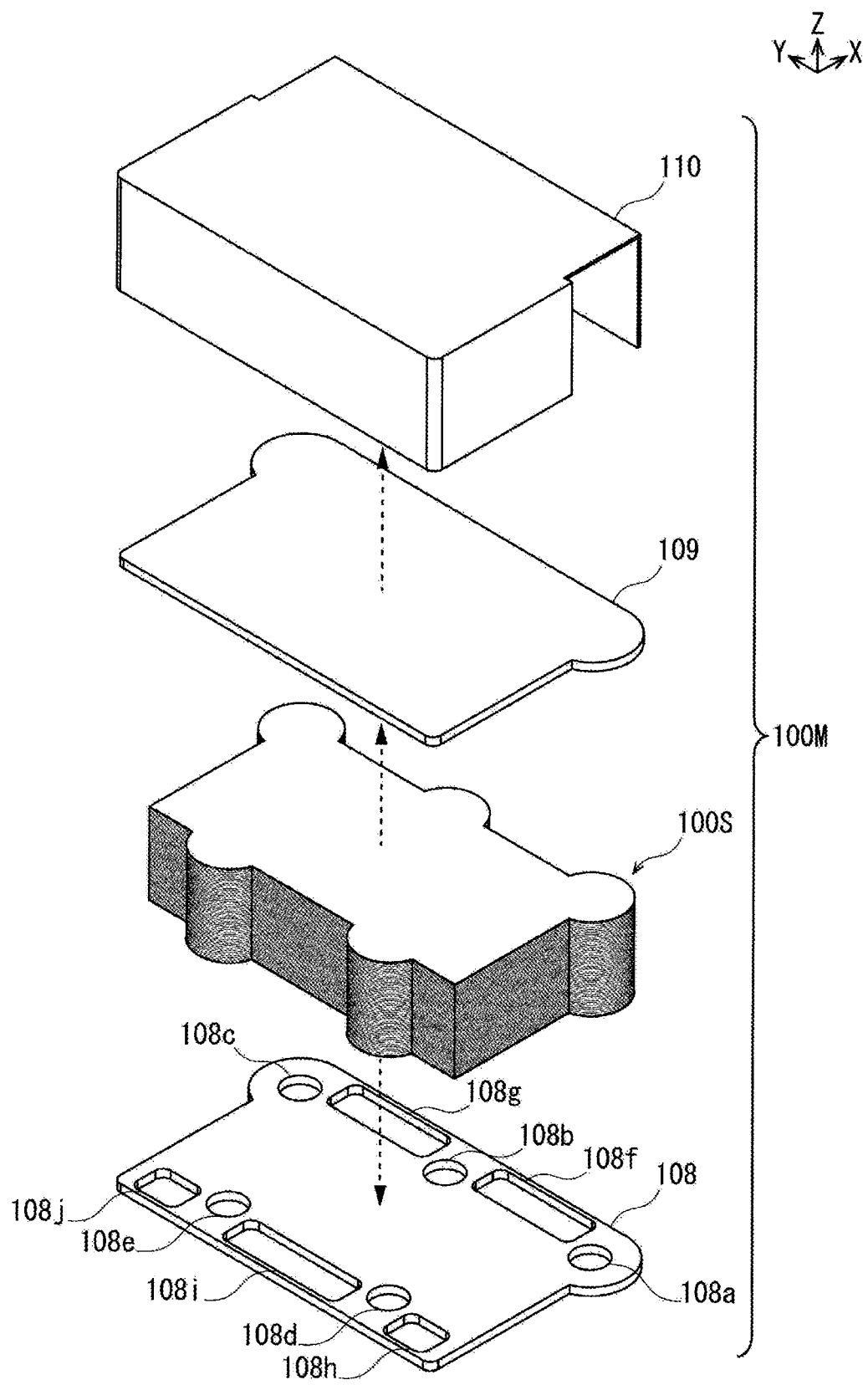
FIG. 3 is a perspective view illustrating a state where the cell stack assembly of FIG. 2 is disassembled into an air shelter, an upper end plate, a stack, and a lower end plate.
Figure 4:
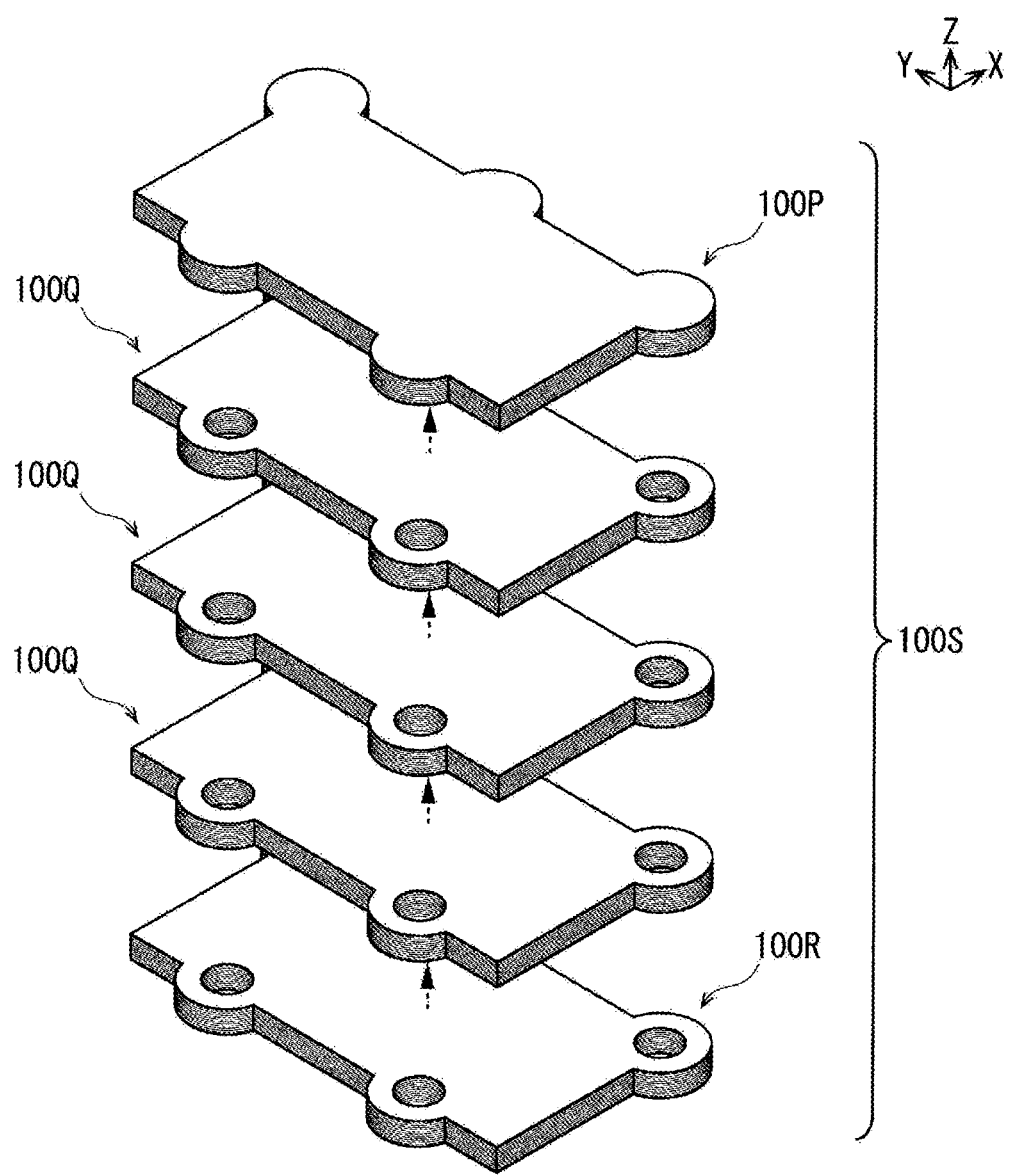
FIG. 4 is a perspective view illustrating a state where the stack of FIG. 3 is disassembled into an upper module unit, multiple middle module units, and a lower module unit.
Figure 5:
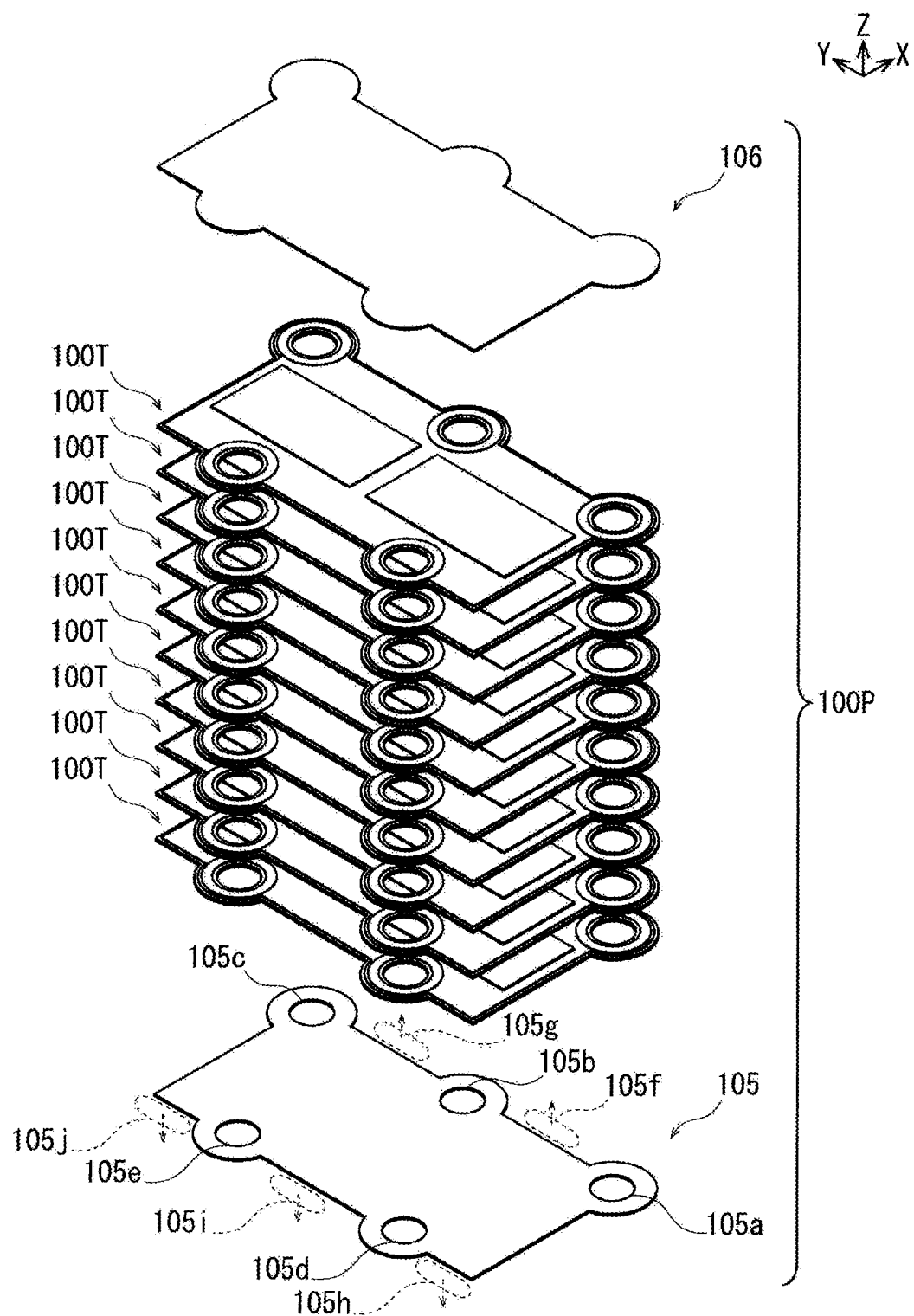
FIG. 5 is a perspective view illustrating the upper module unit of FIG. 4 in a disassembled state.
Figure 6:
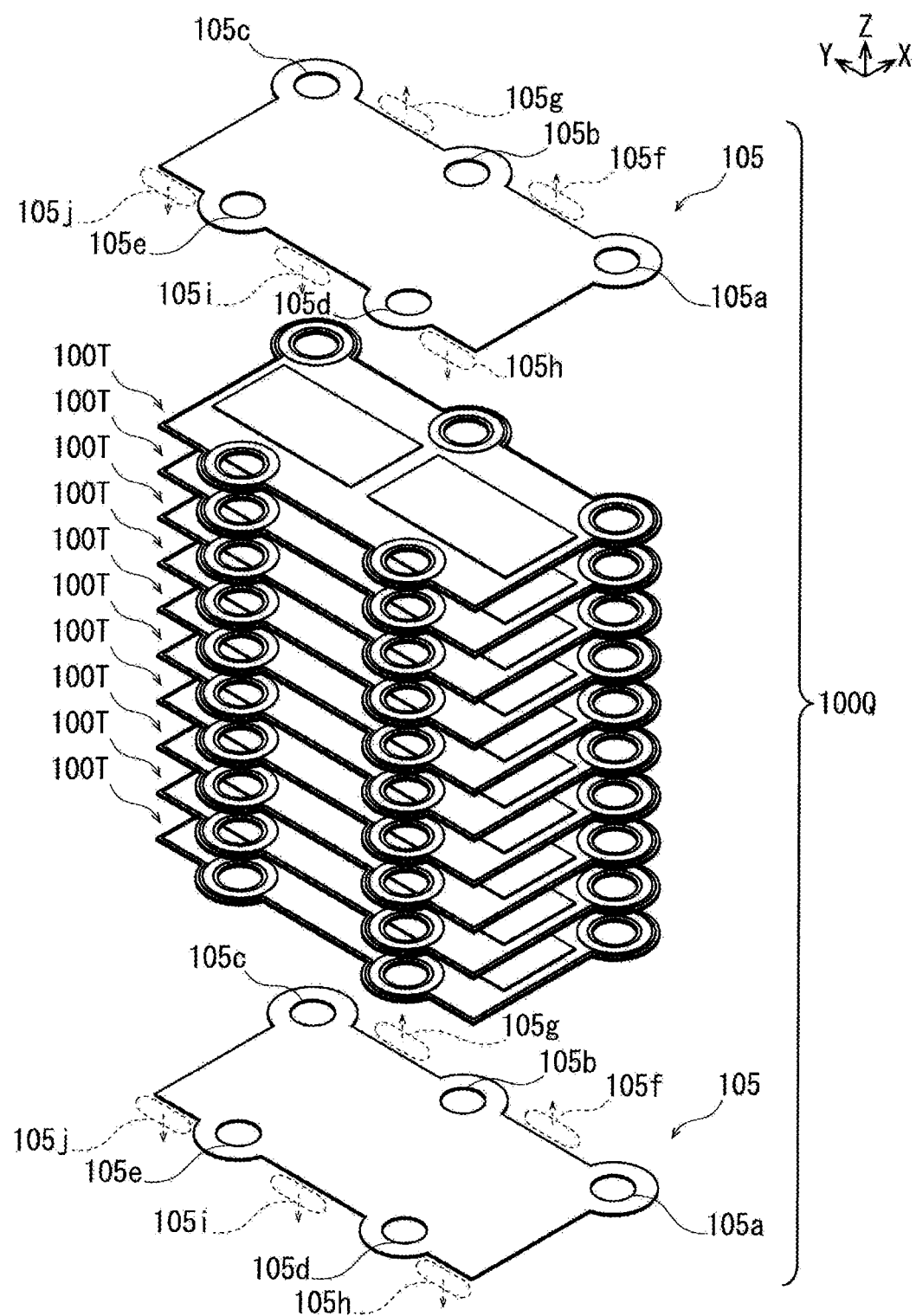
FIG. 6 is a perspective view illustrating one of the middle module units of FIG. 4 in a disassembled state.
Figure 7:
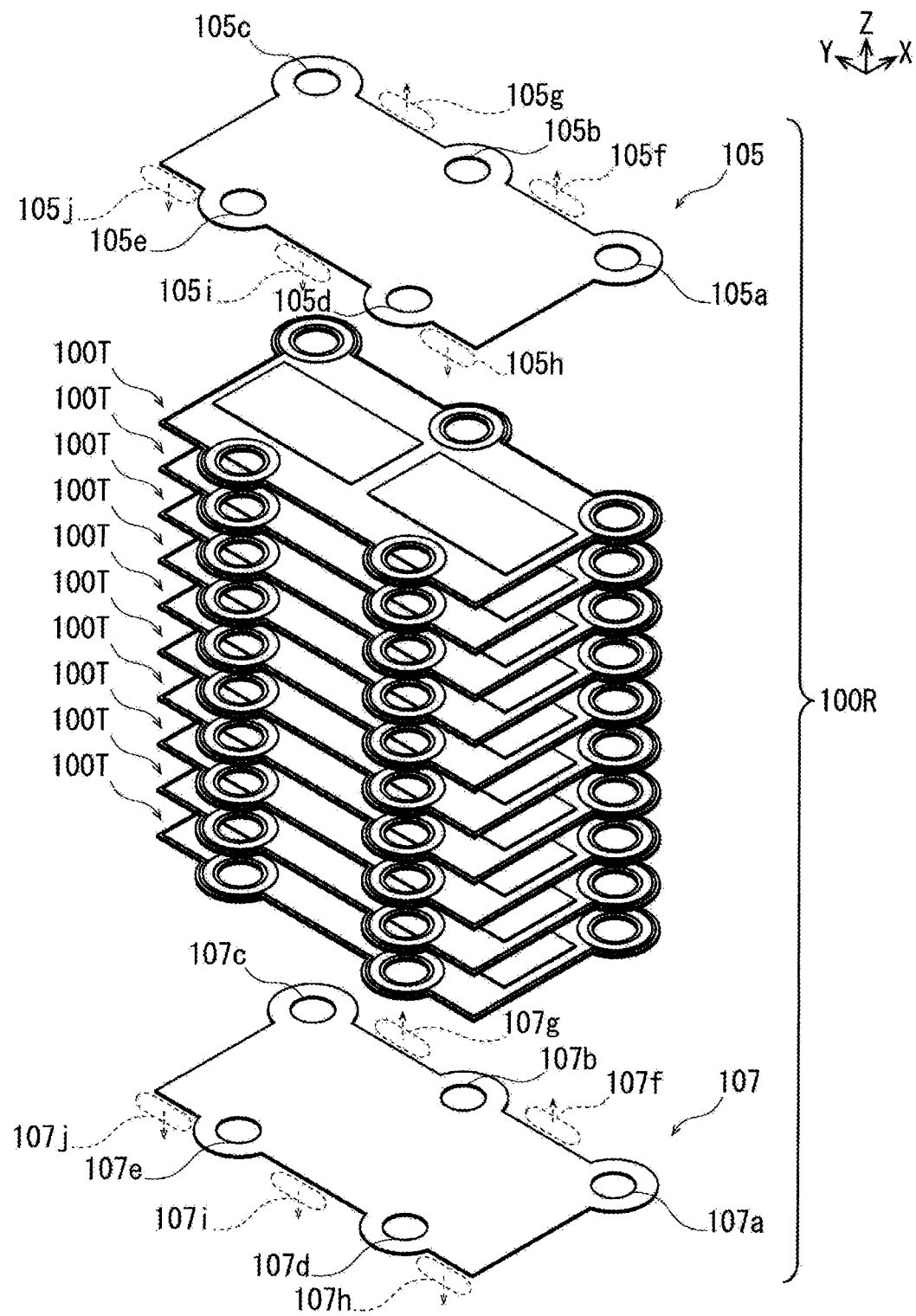
FIG. 7 is a perspective view illustrating the lower module unit of FIG. 4 in a disassembled state.
Figure 8:
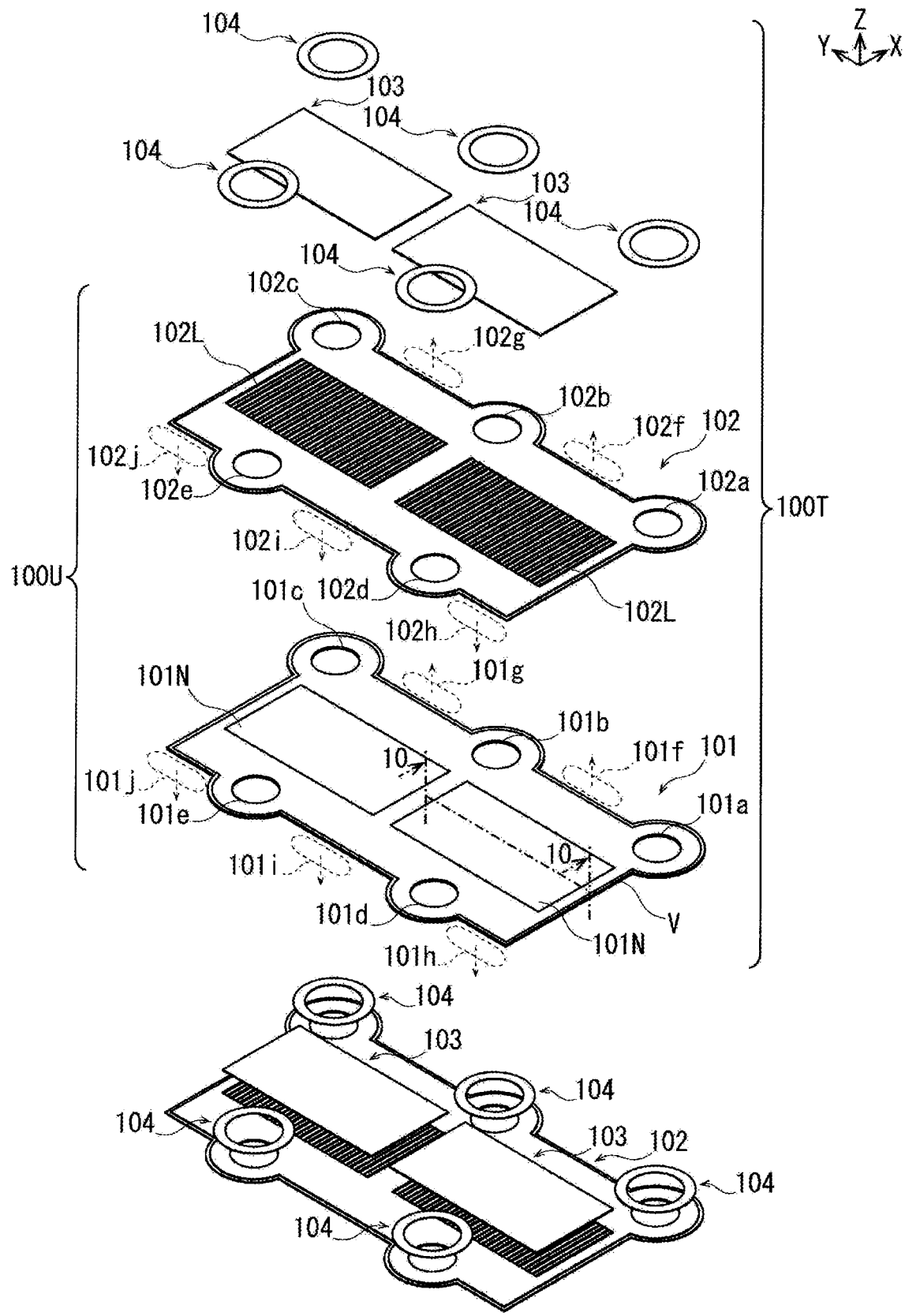
FIG. 8 is a perspective view illustrating one of cell units in FIGS. 5 to 7 and another cell unit (configurations except for a metal-supported cell assembly) located below the one cell unit in a disassembled state.

FIG. 1 is a perspective view illustrating a fuel cell 100 of the first embodiment. FIG. 2 is a perspective view illustrating a state where the fuel cell 100 of FIG. 1 is disassembled into a cover 112, a cell stack assembly 100M, and an external manifold 111. FIG. 3 is a perspective view illustrating a state where the cell stack assembly 100M of FIG. 2 is disassembled into an air shelter 110, an upper end plate 109, a stack 100S, and a lower end plate 108. FIG. 4 is a perspective view illustrating a state where the stack 100S of FIG. 3 is disassembled into an upper module unit 100P, multiple middle module units 100Q, and a lower module unit 100R. FIG. 5 is a perspective view illustrating the upper module unit 100P of FIG. 4 in a disassembled state. FIG. 6 is a perspective view illustrating one of the middle module units 100Q of FIG. 4 in a disassembled state. FIG. 7 is a perspective view illustrating the lower module unit 100R of FIG. 4 in a disassembled state. FIG. 8 is a perspective view illustrating one of cell units 100T of FIGS. 5 to 7 and another cell unit 100T (configurations excluding a metal-supported cell assembly 101) located below the one cell unit 100T in a disassembled state.

Figure 9:
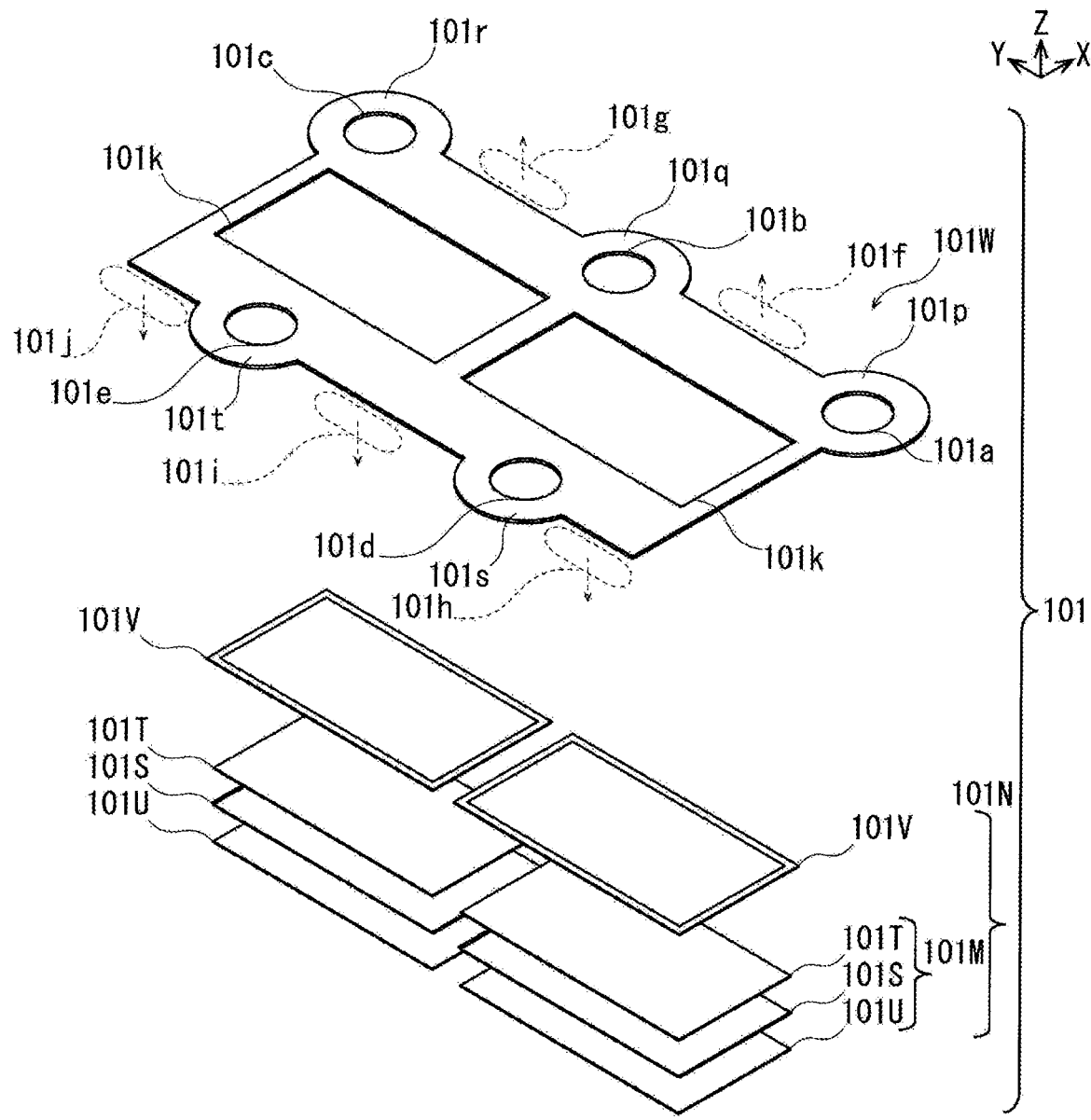
FIG. 9 is a perspective view illustrating the metal-supported cell assembly of FIG. 8 in a disassembled state.
Figure 10:
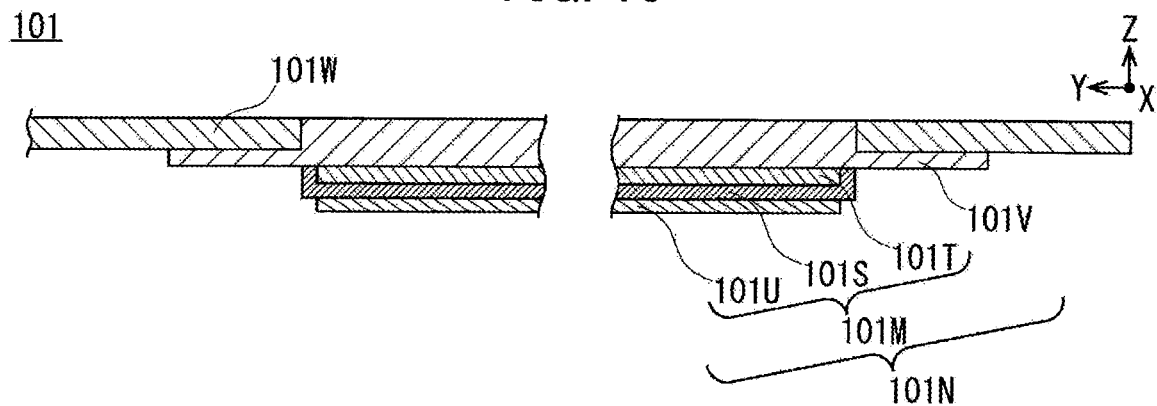
FIG. 10 is a side view illustrating a cross section of the metal-supported cell assembly of FIG. 8.
Figure 11:
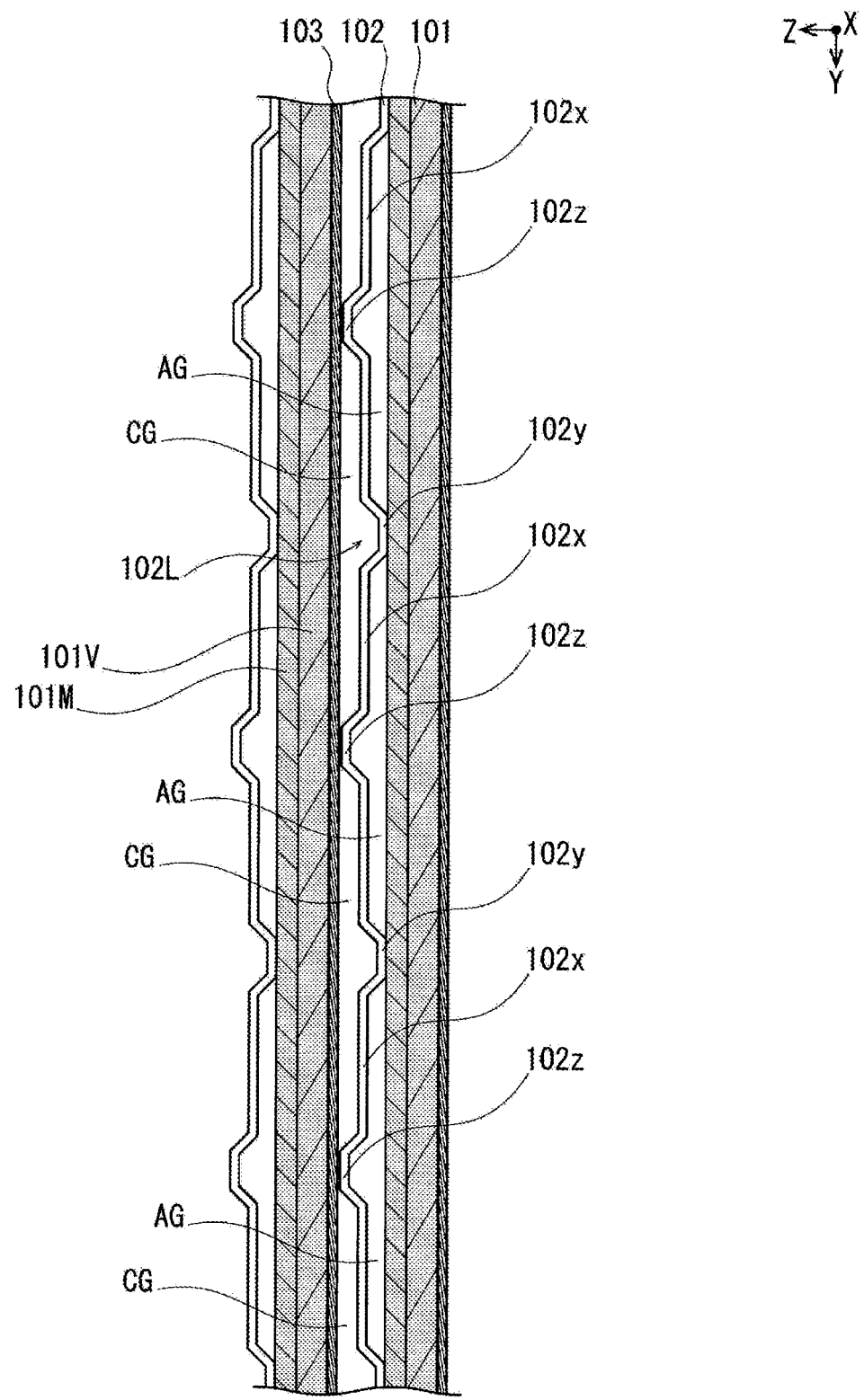
Figure 12:
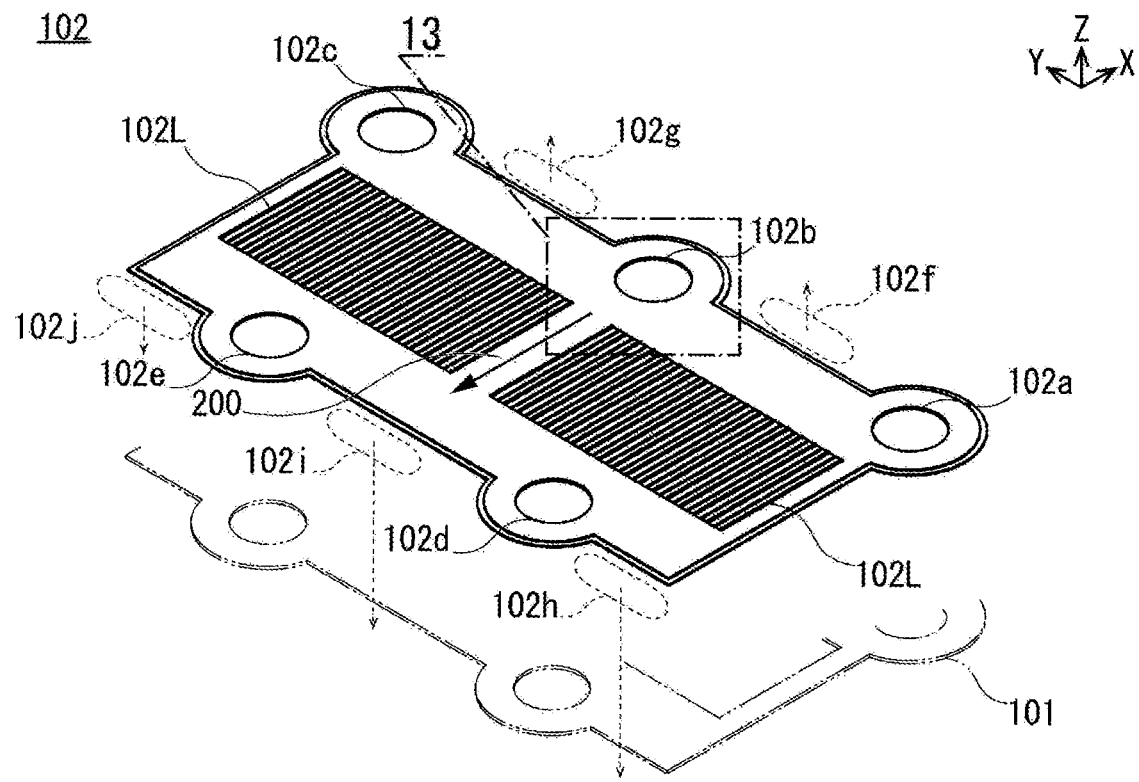
FIG. 12 is a perspective view illustrating a separator of FIG. 8 as viewed from the cathode side (illustrating the separator 102 as viewed from the upper side as in FIG. 8).
Figure 13:
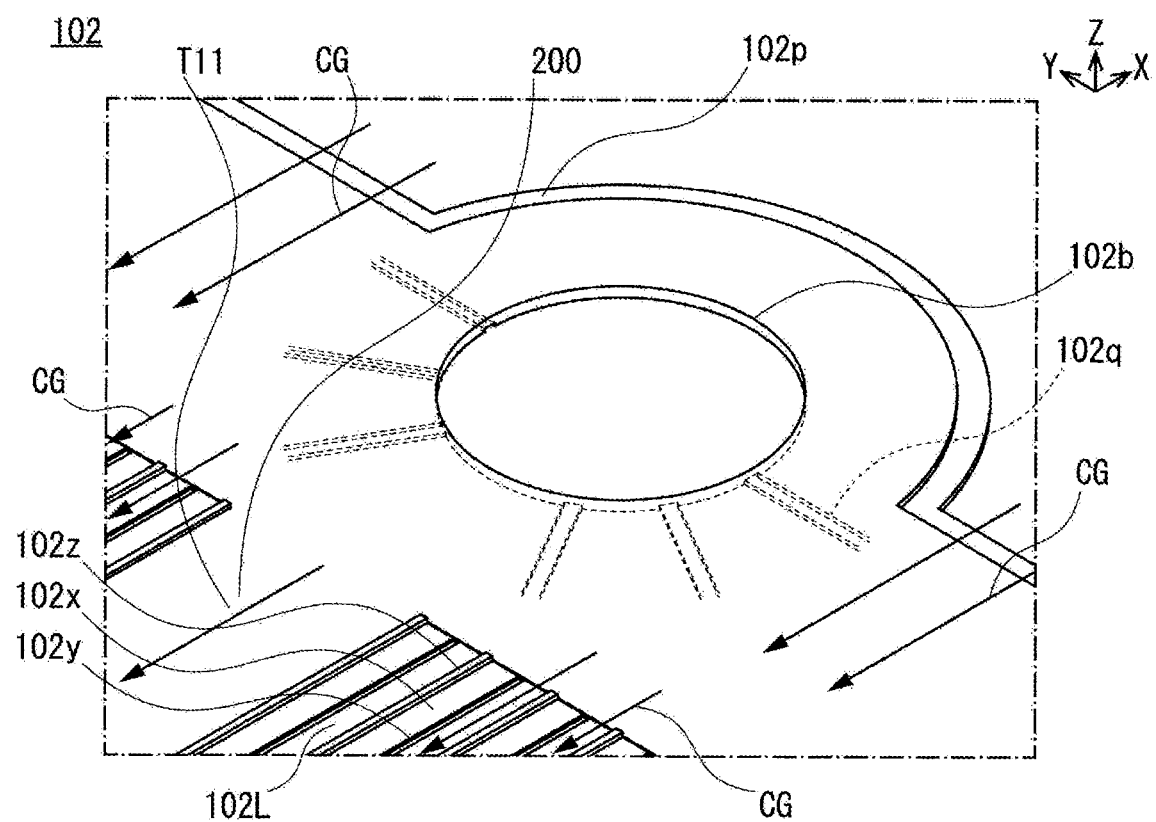
FIG. 13 is a perspective view partially illustrating the separator of FIG. 12.
Figure 14:
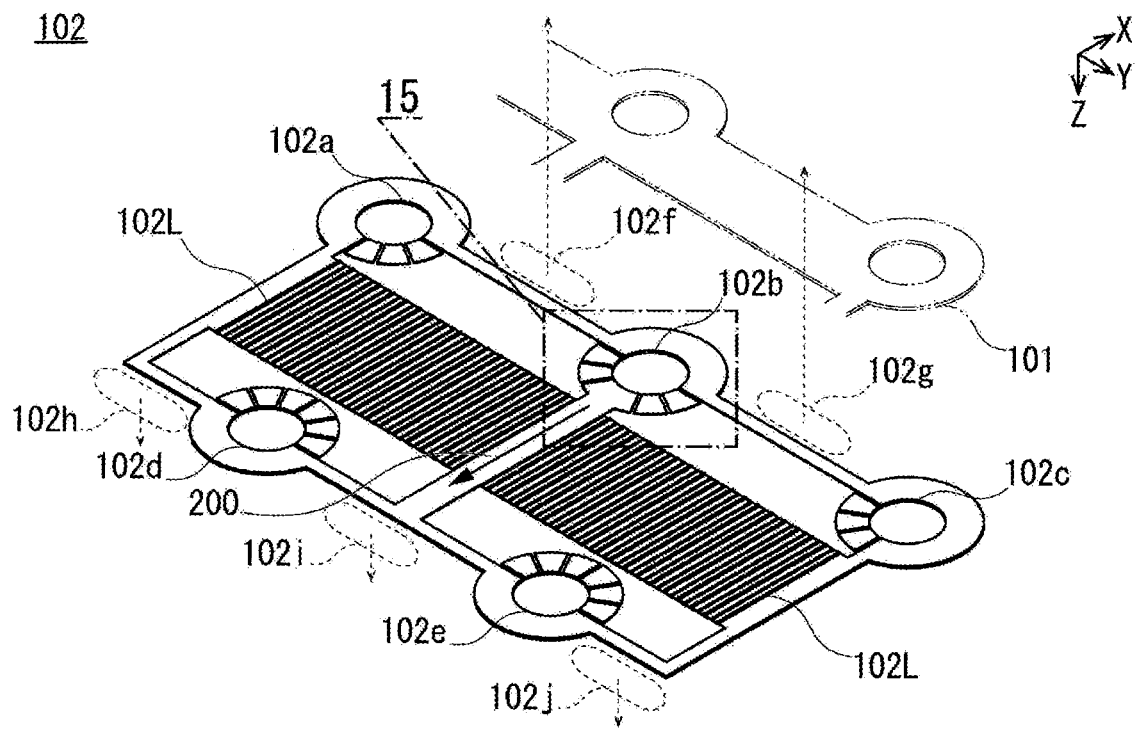
FIG. 14 is a perspective view illustrating the separator of FIG. 8 as viewed from the anode side (illustrating the separator 102 as viewed from the lower side as different from FIG. 8).
Figure 15:
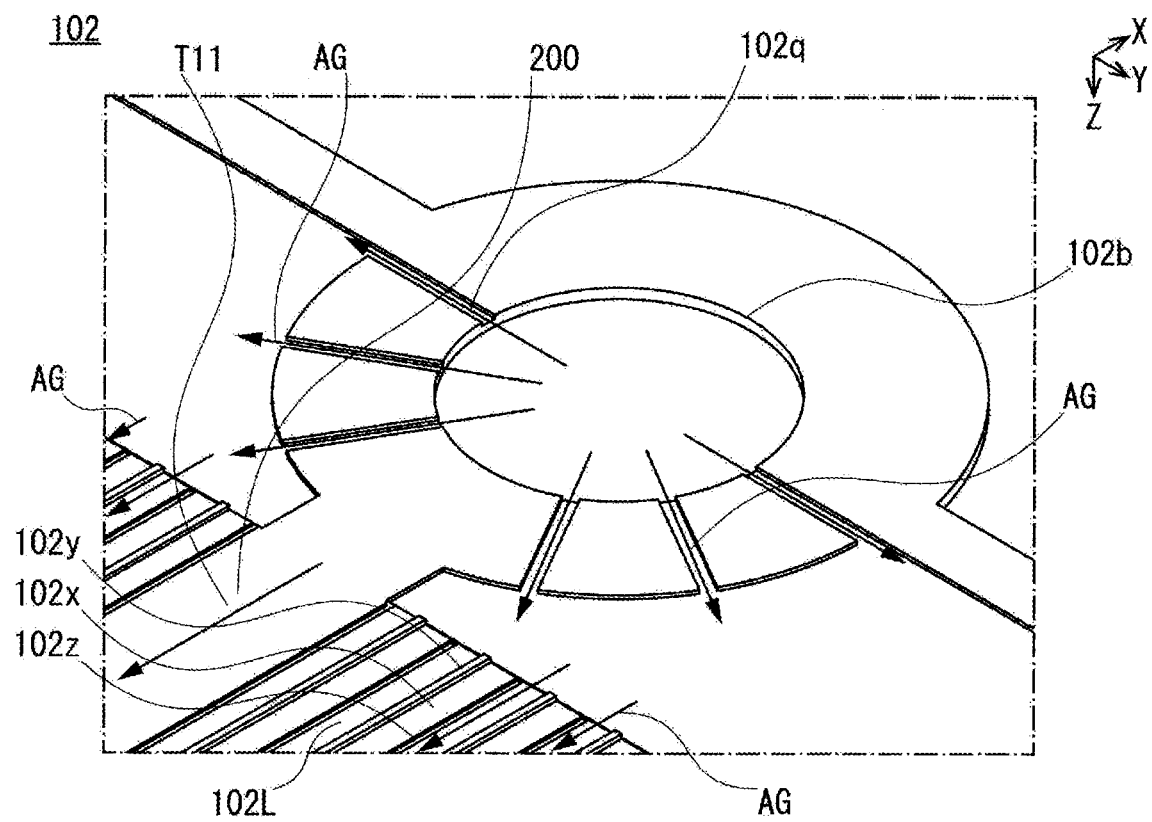
FIG. 15 is a perspective view partially illustrating the separator of FIG. 14.
Figure 16:
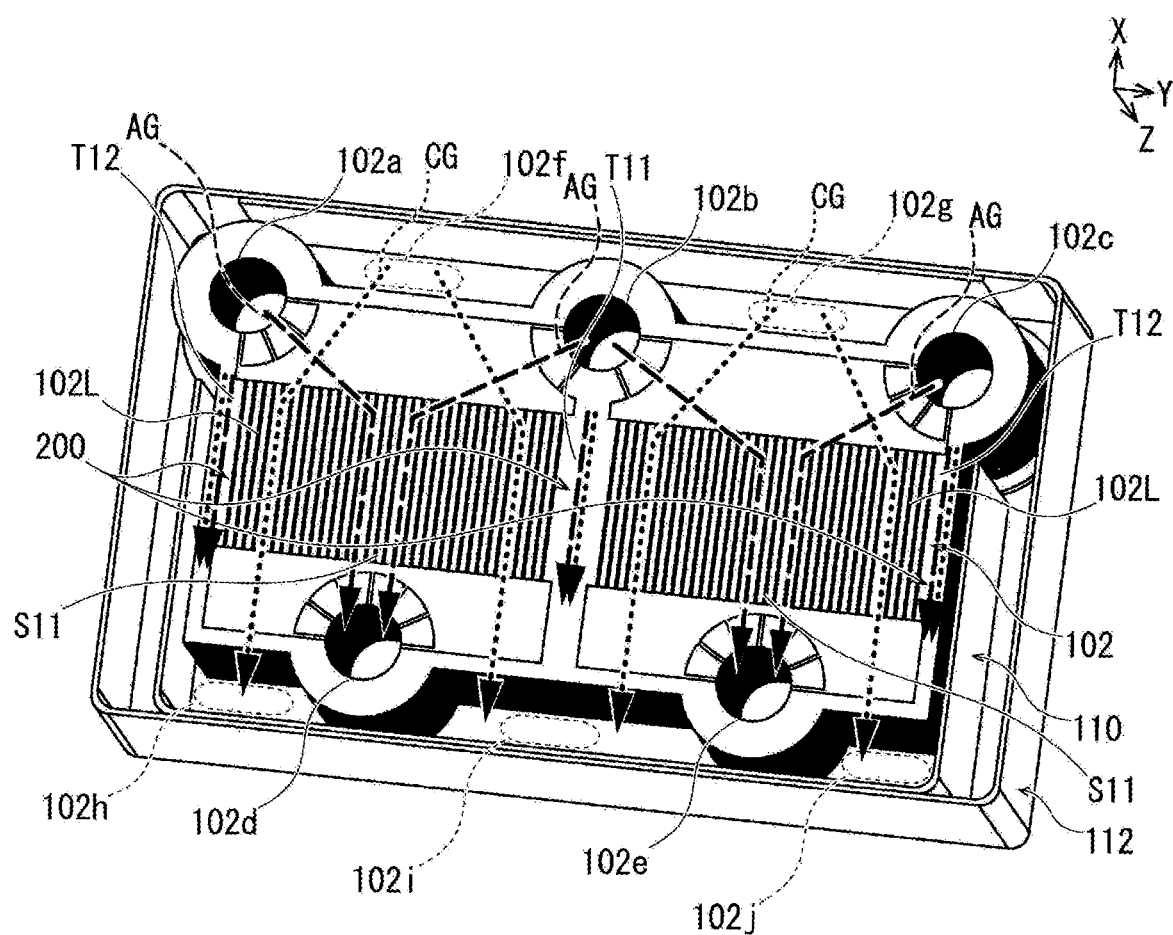
FIG. 16 is a perspective view illustrating an example in which auxiliary flow passages are provided as components of an adjustment portion.
Figure 17:
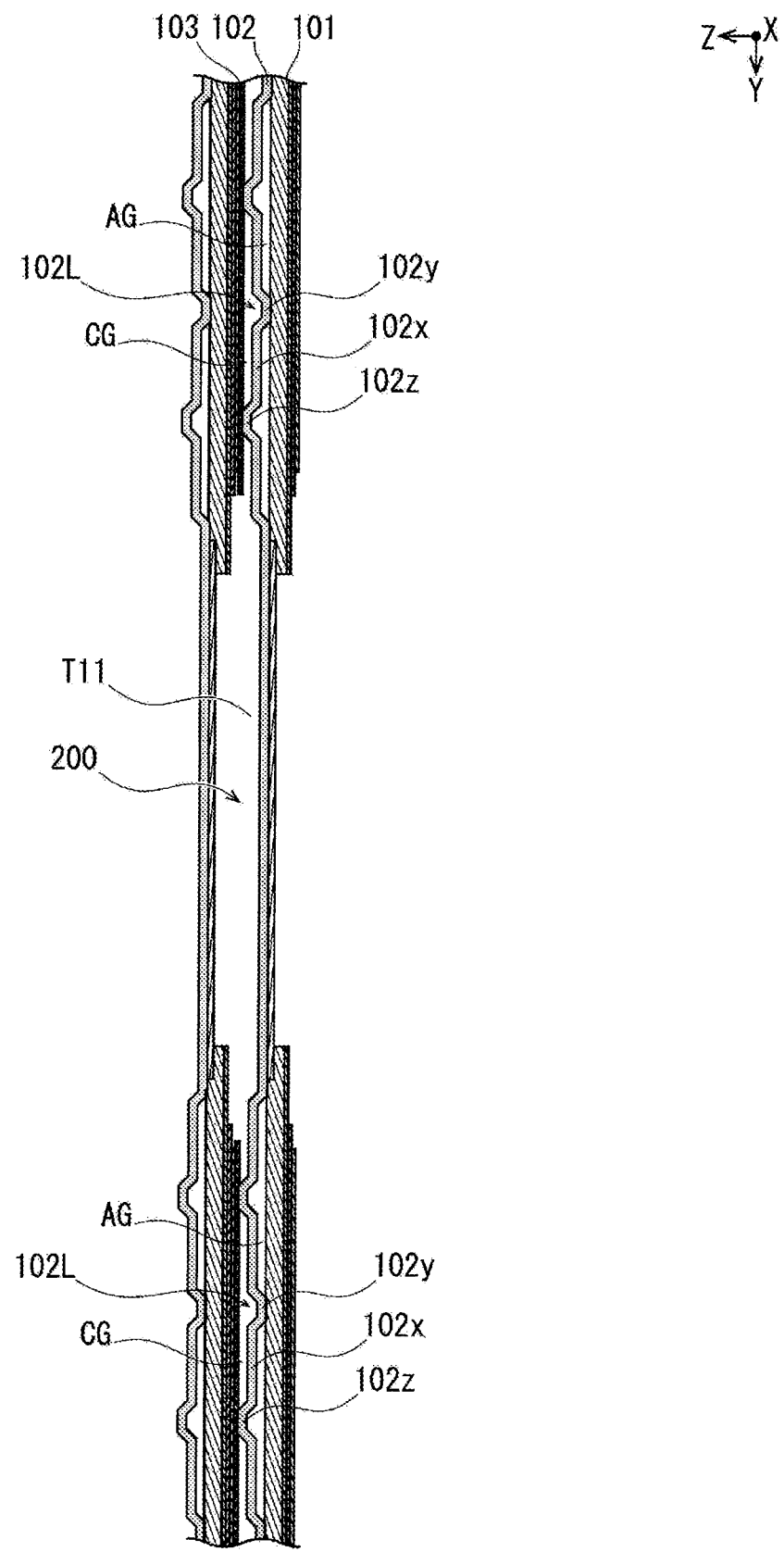
FIG. 17 illustrates a center portion in a state where the metal-supported cell assembly, the separator, and a current collection assisting layer are stacked one on top of another and corresponds to a cross-sectional view illustrating a state where the auxiliary flow passage is provided in this center portion as the component of the adjustment portion.

FIG. 9 is a perspective view illustrating the metal-supported cell assembly 101 of FIG. 8 in a disassembled state. FIG. 10 is a side view illustrating a cross section of the metal-supported cell assembly 101 of FIG. 8. FIG. 11 is a cross-sectional view illustrating the metal-supported cell assembly 101 and the like. FIG. 12 is a perspective view illustrating a separator 102 of FIG. 8 from the cathode side (illustrating the separator 102 as viewed from the upper side as in FIG. 8). FIG. 13 is a perspective view partially illustrating the separator 102 of FIG. 12. FIG. 14 is a perspective view illustrating the separator 102 of FIG. 8 from the anode side (illustrating the separator 102 as viewed from the lower side as different from FIG. 8). FIG. 15 is a perspective view partially illustrating the separator 102 of FIG. 14. FIG. 16 is a cross-sectional view illustrating an example of an adjustment portion 200 provided in an auxiliary flow passage. FIG. 17 corresponds to a cross-sectional view partially (a portion extending over two metal-supported cell assemblies and the like) illustrating a state where the metal-supported cell assemblies 101, the separators 102, and current collection assisting layers 103 are stacked.

As illustrated in FIGS. 1 and 2, a unit structure of the fuel cell 100 is formed by sandwiching the cell stack assembly 100M between the external manifold 111 configured to supply gas from the outside and the cover 112 configured to protect the cell stack assembly 100M from the upper and lower sides.

In the unit structure of the fuel cell 100, as illustrated in FIGS. 2 and 3, the cell stack assembly 100M is formed by sandwiching the stack 100S between the upper end plate 109 and the lower end plate 108 from the upper and lower sides and covering the stack 100S with the air shelter 110 configured to seal a cathode gas CG. As illustrated in FIGS. 3 and 4, the stack 100S is formed by stacking the upper module unit 100P, the multiple middle module units 100Q, and the lower module unit 100R.

In the unit structure of the fuel cell 100, as illustrated in FIG. 5, the upper module unit 100P is formed by sandwiching the multiple cell units 100T stacked one on top of another between an upper current collection plate 106 configured to output power generated in the cell units 100T to the outside and a module end 105 corresponding to an end plate from the upper and lower sides. As illustrated in FIG. 6, each middle module unit 100Q is formed by sandwiching the multiple cell units 100T stacked one on top of another between the paired module ends 105 from the upper and lower sides. As illustrated in FIG. 7, the lower module unit 100R is formed by sandwiching the multiple cell units 100T stacked one on top of another between the module end 105 and a lower current collection plate 107 from the upper and lower sides.

In the unit structure of the fuel cell 100, as illustrated in FIG. 8, each cell unit 100T includes the metal-supported cell assembly 101 which is provided with power generation cells 101M configured to generate power by using supplied gas, the separator 102 which isolates the power generation cells 101M of the metal-supported cell assemblies 101 adjacent in the stacking direction Z from one another, the current collection assisting layers 103 which make surface pressure even while forming a space allowing gas to flow between the separator 102 and the power generation cells 101M of the metal-supported cell assembly 101, and sealing members 104 which seal edges of manifold portions of the metal-supported cell assembly 101 and the separator 102 and limit a flow of gas. The current collection assisting layers 103 and the sealing members 104 are arranged between the metal-supported cell assembly 101 and the separator 102 adjacent to each other in the stacking direction Z due to their structures.

In this case, in a manufacturing method of the fuel cell 100, as illustrated in a center portion of FIG. 8, outer edges of the metal-supported cell assembly 101 and the separator 102 are annularly joined along a joining line V and a joined body 100U is formed. Accordingly, the current collection assisting layers 103 and the sealing members 104 are configured to be arranged between the joined bodies 100U (the metal-supported cell assembly 101 and the separator 102) adjacent to each other in the stacking direction Z. Specifically, as illustrated in a lower portion of FIG. 8, the current collection assisting layers 103 and the sealing members 104 are arranged between the metal-supported cell assembly 101 of one joined body 100U and the separator 102 of another joined body 100U adjacent to the one joined body 100U in the stacking direction Z.

Configurations of the fuel cell 100 are described below.

As illustrated in FIGS. 9 and 10, the metal-supported cell assembly 101 is provided with the power generation cells 101M configured to generate power by using the supplied gas.

As illustrated in FIG. 9, the metal-supported cell assembly 101 is formed of two metal-supported cells 101N arranged side by side in the long-side direction Y and a cell frame 101W holding peripheries of the metal-supported cells 101N.

Each metal-supported cell 101N is formed of the power generation cell 101M and a support metal 101V supporting the power generation cell 101M from one side. In the metal-supported cell assembly 101, as illustrated in FIGS. 9 and 10, each power generation cell 101M is formed by sandwiching an electrolyte 101S between an anode 101T and a cathode 101U.

As illustrated in FIGS. 9 and 10, the anode 101T is a fuel electrode and causes an anode gas AG (for example, hydrogen) to react with oxide ions to generate oxide of the anode gas AG and take out electrons. The anode 101T is resistant to a reducing atmosphere, allows the anode gas AG to pass through, has high electrical conductivity, and has a catalyst effect of causing the anode gas AG to react with oxide ions. The anode 101T is formed in a rectangular shape smaller than the electrolyte 101S. For example, the anode 101T is made of cemented carbide in which metal such as nickel and oxide ion conductor such as yttria-stabilized zirconia are mixed. As illustrated in FIGS. 9 and 10, the anode 101T has a rectangular thin plate shape.

As illustrated in FIGS. 9 and 10, the electrolyte 101S allows oxide ions to pass through from the cathode 101U to the anode 101T. The electrolyte 101S allows oxide ions to pass through but does not allow gas and electrons to pass through. The electrolyte 101S is formed in a rectangular shape. For example, the electrolyte 101S is made of solid oxide ceramic such as stabilized zirconia containing yttrium, neodymium oxide, samarium, gadolinium, scandium, or the like in a solid solution state. As illustrated in FIGS. 9 and 10, the electrolyte 101S has a rectangular thin plate shape slightly larger than the anode 101T. As illustrated in FIG. 10, an outer edge of the electrolyte 101S is bent toward the anode 101T and is in contact with a side surface of the anode 101T extending in the stacking direction Z. An end of the outer edge of the electrolyte 101S is in contact with the support metal 101V.

As illustrated in FIGS. 9 and 10, the cathode 101U is an oxidant electrode and causes the cathode gas CG (for example, oxygen included in air) to react with electrons to convert oxygen molecules into oxide ions. The cathode 101U is resistant to an oxidizing atmosphere, allows the cathode gas CG to pass through, has high electrical conductivity, and has a catalyst effect of converting oxygen molecules into oxide ions. The cathode 101U is formed in a rectangular shape smaller than the electrolyte 101S. For example, the cathode 101U is made of an oxide of lanthanum, strontium, manganese, cobalt, or the like. As illustrated in FIGS. 9 and 10, like the anode 101T, the cathode 101U has a rectangular thin plate shape. The cathode 101U faces the anode 101T with the electrolyte 101S therebetween. Since the outer edge of the electrolyte 101S is bent toward the anode 101T, an outer edge of the cathode 101U does not come into contact with an outer edge of the anode 101T.

As illustrated in FIGS. 9 and 10, the support metal 101V supports the power generation cell 101M from the anode 101T side. The support metal 101V has gas permeability, high electrical conductivity, and sufficient strength. The support metal 101V is formed in a rectangular shape sufficiently larger than the anode 101T. For example, the support metal 101V is made of stainless steel or corrosion resistant alloy or corrosion resistant steel containing nickel and chrome.

As illustrated in FIGS. 9 and 10, the cell frame 101W holds the peripheries of the metal-supported cells 101N. The cell frame 101W is formed in a thin rectangular shape. The cell frame 101W is provided with paired opening portions 101k arranged in the long-side direction Y. Each of the paired opening portions 101k of the cell frame 101W is a rectangular penetrating hole and is smaller than an outer shape of the support metal 101V. The cell frame 101W is made of metal and is insulated by using an insulator or coating. The insulator is formed by, for example, attaching aluminum oxide to the cell frame 101W. The metal-supported cell 101N is joined to the cell frame 101W by joining outer edges of the support metals 101V to inner edges of the opening portions 101k of the cell frame 101W.

As illustrated in FIGS. 9 and 10, the cell frame 101W is provided with circular extending portions (a first extending portion 101p, a second extending portion 101q, and a third extending portion 101r) extending in a surface direction, respectively, from a right end, a center portion, and a left end of one side extending in the long-side direction Y. The cell frame 101W is provided with circular extending portions (a fourth extending portion 101s and a fifth extending portion 101t) extending in the surface direction, respectively, from two portions of another side extending in the long-side direction Y which are away from the center of the other side. In the cell frame 101W, the first, second, and third extending portions 101p, 101q, and 101r and the fourth and fifth extending portions 101s and 101t are arranged alternately in the longitudinal direction Y across the paired opening portions 101k.

As illustrated in FIGS. 9 and 10, the cell frame 101W is provided with an anode side first flow-in port 101a, an anode side second flow-in port 101b, and an anode side third flow-in port 101c for passing (flow-in) of the anode gas AG respectively in the first extending portion 101p, the second extending portion 101q, and the third extending portion 101r. The cell frame 101W is provided with an anode side first flow-out port 101d and an anode side second flow-out port 101e for passing (flow-out) of the anode gas AG respectively in the fourth extending portion 101s and the fifth extending portion 101t. The anode side first flow-in port 101a, the anode side second flow-in port 101b, the anode side third flow-in port 101c, the anode side first flow-out port 101d, and the anode side second flow-out port 101e of the anode gas AG are so-called manifold.

As illustrated in FIG. 9, the cell frame 101W is provided with a cathode side first flow-in port 101f for passing (flow-in) of the cathode gas CG in a space between the first extending portion 101p and the second extending portion 101q. The cell frame 101W is provided with a cathode side second flow-in port 101g for passing (flow-in) of the cathode gas CG in a space between the second extending portion 101q and the third extending portion 101r. The cell frame 101W is provided with a cathode side first flow-out port 101h for passing (flow-out) of the cathode gas CG on the right side of the fourth extending portion 101s in FIG. 9. The cell frame 101W is provided with a cathode side second flow-out port 101i for passing (flow-out) of the cathode gas CG in a space between the fourth extending portion 101s and the fifth extending portion 101t. The cell frame 101W is provided with a cathode side third flow-out port 101j for passing (flow-out) of the cathode gas CG on the left side of the fifth extending portion 101t in FIG. 9. In the cell frame 101W, the cathode side first flow-in port 101f, the cathode side second flow-in port 101g, the cathode side first flow-out port 101h, the cathode side second flow-out port 101i, and the cathode side third flow-out port 101j correspond to spaces between an outer peripheral surface of the cell frame 101W and an inner surface of the air shelter 110.

As illustrated in FIGS. 8, 11, and 12, the separator 102 is provided between the power generation cells 101M of the stacked metal-supported cell assemblies 101 and isolates the adjacent power generation cells 101M from one another.

The separator 102 is arranged to face the metal-supported cell assembly 101. The separator 102 has the same outer shape as the metal-supported cell assembly 101. The separator 102 is made of metal and is insulated by using an insulator or coating except for regions facing the power generation cells 101M (flow passage portions 102L). The insulator is formed by, for example, attaching aluminum oxide to the separator 102. In the separator 102, the flow passage portions 102L are provided side by side in the long-side direction Y to face the power generation cells 101M.

In the separator 102, as illustrated in FIGS. 8, 11, and 12, each flow passage portion 102L is formed by arranging flow passages, extending in a direction (short-side direction X) of gas flow, side by side in a direction (long-side direction Y) orthogonal to the direction (short-side direction X) of gas flow. As illustrated in FIGS. 11 to 15, in each flow passage portion 102L, protrusion-shaped anode side projections 102y are provided at fixed intervals to protrude downward from a flat portion 102x being flat in a plane extending in the long-side direction Y and the short-side direction X. The anode side projections 102y extend in the direction (short-side direction X) of gas flow. The anode side projections 102y protrude downward from a lower end of the separator 102. As illustrated in FIGS. 11 to 15, in each flow passage portion 102L, protrusion-shaped cathode side projections 102z are provided at fixed intervals to protrude upward from the flat portion 102x. The cathode side projections 102z extend in the direction (short-side direction X) of gas flow. The cathode side projections 102z protrude upward from an upper end of the separator 102. In each flow passage portion 102L, the anode side projections 102y and the protrusion-shape cathode side projections 102z are provided alternately in the long-side direction Y with the flat portion 102x therebetween.

In the separator 102, as illustrated in FIGS. 11 and 17, gaps between the flow passage portions 102L and the metal-supported cell assembly 101 located below the flow passage portions 102L are formed as flow passages of the anode gas AG. The anode gas AG flows from an anode side second flow-in port 102b and the like of the separator 102 illustrated in FIG. 14 into the flow passage portions 102L on the anode side through multiple grooves 102q illustrated in FIGS. 14 and 15. In the separator 102, as illustrated in FIGS. 14 and 15, the multiple grooves 102q are formed to radially extend from an anode side first flow-in port 102a, the anode side second flow-in port 102b, and an anode side third flow-in port 102c toward the flow passage portions 102L on the anode side. In the separator 102, as illustrated in FIGS. 11 and 17, gaps between the flow passage portions 102L and the metal-supported cell assembly 101 located above the flow passage portions 102L are formed as flow passages of the cathode gas CG. The cathode gas CG flows from a cathode side first flow-in port 102f and a cathode side second flow-in port 102g of the separator 102 illustrated in FIG. 12 into the flow passage portions 102L on the cathode side by crossing an outer edge 102p of the separator 102 on the cathode side illustrated in FIGS. 12 and 13. In the separator 102, as illustrated in FIG. 13, the outer edge 102p on the cathode side is formed to be thinner than other portions.

As illustrated in FIGS. 8, 12, and 14, in the separator 102, the anode side first flow-in port 102a, the anode side second flow-in port 102b, the anode side third flow-in port 102c, an anode side first flow-out port 102d, and an anode side second flow-out port 102e for passing of the anode gas AG are provided to be aligned relative to the metal-supported cell assembly 101 in the stacking direction Z. In the separator 102, the cathode side first flow-in port 102f, the cathode side second flow-in port 102g, a cathode side first flow-out port 102h, a cathode side second flow-out port 102i, and a cathode side third flow-out port 102j for passing of the cathode gas CG are provided to be aligned relative to the metal-supported cell assembly 101 in the stacking direction Z. In the separator 102, the cathode side first flow-in port 102f, the cathode side second flow-in port 102g, the cathode side first flow-out port 102h, the cathode side second flow-out port 102i, and the cathode side third flow-out port 102j of the cathode gas CG correspond to spaces between an outer peripheral surface of the separator 102 and the inner surface of the air shelter 110.

As illustrated in FIG. 8, each current collection assisting layer 103 makes the surface pressure even while forming a space allowing the gas to flow between the power generation cell 101M and the separator 102 and assists an electrical contact between the power generation cell 101M and the separator 102.

The current collection assisting layer 103 is so-called expanded metal. The current collection assisting layer 103 is arranged between the power generation cell 101M and the flow passage portion 102L of the separator 102. The current collection assisting layer 103 has the same outer shape as the power generation cell 101M. The current collection assisting layer 103 has a metal mesh shape provided with openings of a rhombic shape or the like arranged in a lattice pattern.

As illustrated in FIG. 8, the sealing members 104 partially seal the gap between the metal-supported cell assembly 101 and the separator 102 and limit the flow of gas.

The sealing members 104 have functions of a spacer and a seal and are so-called gaskets. The sealing members 104 prevent the anode gas AG from flowing from the anode side flow-in ports (for example, the anode side first flow-in port 102a) and the anode side flow-out ports (for example, the anode side first flow-out port 102d) of the separator 102 toward the flow passages of the separator 102 on the cathode side and mixing into the flow passages. The sealing members 104 are formed in a ring shape. The sealing members 104 are joined to inner peripheral edges of the anode side flow-in ports (for example, the anode side first flow-in port 102a) and the anode side flow-out port (for example, the anode side first flow-out port 102d) leading to the surface of the separator 102 on the cathode side. For example, the sealing members 104 are made of Thermiculite with heat resistance and sealing properties.

As illustrated in FIGS. 5 to 7, each module end 105 is a plate which holds a lower end or an upper end of the multiple cell units 100T stacked one on top of another.

The module end 105 is arranged at the lower end or the upper end of the multiple cell units 100T stacked one on top of another. The module end 105 has the same outer shape as the cell units 100T. The module end 105 is made of an electrically-conductive material which does not allow gas to pass through and is insulated by using an insulator or coating except for regions facing the power generation cells 101M and the other module end 105. The insulator is formed by, for example, attaching aluminum oxide to the module end 105.

In the module end 105, an anode side first flow-in port 105a, an anode side second flow-in port 105b, an anode side third flow-in port 105c, an anode side first flow-out port 105d, and an anode side second flow-out port 105e for passing of the anode gas AG are provided to be aligned relative to the cell units 100T in the stacking direction Z. In the module end 105, a cathode side first flow-in port 105f, a cathode side second flow-in port 105g, a cathode side first flow-out port 105h, a cathode side second flow-out port 105i, and a cathode side third flow-out port 105j for passing of the cathode gas CG are provided to be aligned relative to the cell units 100T in the stacking direction Z. In the module end 105, the cathode side first flow-in port 105f, the cathode side second flow-in port 105g, the cathode side first flow-out port 105h, the cathode side second flow-out port 105i, and the cathode side third flow-out port 105j corresponds to spaces between an outer peripheral surface of the module end 105 and the inner surface of the air shelter 110.

As illustrated in FIG. 5, the upper current collection plate 106 outputs power generated in the cell units 100T to the outside.

As illustrated in FIG. 5, the upper current collection plate 106 is arranged at an upper end of the upper module unit 100P. The upper current collection plate 106 has the same outer shape as the cell units 100T. The upper current collection plate 106 is provided with a terminal (not illustrated) to be connected to an external current carrying member. The upper current collection plate 106 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the upper current collection plate 106.

As illustrated in FIG. 7, the lower current collection plate 107 outputs power generated in the cell units 100T to the outside.

As illustrated in FIG. 7, the lower current collection plate 107 is arranged at a lower end of the lower module unit 100R. The lower current collection plate 107 has the same outer shape as the upper current collection plate 106. The lower current collection plate 107 is provided with a terminal (not illustrated) to be connected to an external current carrying member. The lower current collection plate 107 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the lower current collection plate 107.

In the lower current collection plate 107, an anode side first flow-in port 107a, an anode side second flow-in port 107b, an anode side third flow-in port 107c, an anode side first flow-out port 107d, and an anode side second flow-out port 107e for passing of the anode gas AG are provided to be aligned relative to the cell units 100T in the stacking direction Z. In the lower current collection plate 107, a cathode side first flow-in port 107f, a cathode side second flow-in port 107g, a cathode side first flow-out port 107h, a cathode side second flow-out port 107i, and a cathode side third flow-out port 107j for passing of the cathode gas CG are provided to be aligned relative to the cell units 100T in the stacking direction Z. In the lower current collection plate 107, the cathode side first flow-in port 107f, the cathode side second flow-in port 107g, the cathode side first flow-out port 107h, the cathode side second flow-out port 107i, and the cathode side third flow-out port 107j correspond to spaces between an outer peripheral surface of the lower current collection plate 107 and the inner surface of the air shelter 110.

As illustrated in FIGS. 2 and 3, the lower end plate 108 holds the stack 100S from the lower side.

The lower end plate 108 is arranged at a lower end of the stack 100S. The lower end plate 108 has the same outer shape as the cell units 100T except for some portions. Both ends of the lower end plate 108 in the long-side direction Y are formed to extend linearly to form flow-in ports and discharge ports of the cathode gas CG. The lower end plate 108 is formed to be sufficiently thicker than the cell unit 100T. For example, the lower end plate 108 is made of metal and an upper surface to be in contact with the lower current collection plate 107 is insulated by using an insulator or coating. The insulator is formed by, for example, attaching aluminum oxide to the lower end plate 108.

In the lower end plate 108, an anode side first flow-in port 108a, an anode side second flow-in port 108b, an anode side third flow-in port 108c, an anode side first flow-out port 108d, and an anode side second flow-out port 108e for passing of the anode gas AG are provided to be aligned relative to the cell units 100T in the stacking direction Z. In the lower end plate 108, a cathode side first flow-in port 108f, a cathode side second flow-in port 108g, a cathode side first flow-out port 108h, a cathode side second flow-out port 108i, and a cathode side third flow-out port 108j for passing of the cathode gas CG are provided to be aligned relative to the cell units 100T in the stacking direction Z.

As illustrated in FIGS. 2 and 3, the upper end plate 109 holds the stack 100S from the upper side.

The upper end plate 109 is arranged at an upper end of the stack 100S. The upper end plate 109 has the same outer shape as the lower end plate 108. Unlike the lower end plate 108, the upper end plate 109 is provided with no flow-in ports or discharge ports of gas. For example, the upper end plate 109 is made of metal and a lower surface to be in contact with the upper current collection plate 106 is insulated by using an insulator or coating. The insulator is formed by, for example, attaching aluminum oxide to the upper end plate 109.

As illustrated in FIGS. 2 and 3, the air shelter 110 forms the flow passages of the cathode gas CG between itself and the stack 100S.

As illustrated in FIGS. 2 and 3, the air shelter 110 covers the stack 100S sandwiched between the lower end plate 108 and the upper end plate 109, from above. The air shelter 110 forms the flow-in ports and the flow-out ports of the cathode gas CG for the components of the stack 100S, by using gap portions between the inner surface of the air shelter 110 and a side surface of the stack 100S. The air shelter 110 is formed in a box shape and the entire lower portion and part of the side portion are opened. For example, the air shelter 110 is made of metal and the inner surface is insulated by using an insulator or coating. The insulator is formed by, for example, attaching aluminum oxide to the air shelter 110.

As illustrated in FIGS. 1 and 2, the external manifold 111 supplies gas from the outside to the multiple cell units 100T.

The external manifold 111 is arranged below the cell stack assembly 100M. The external manifold 111 has an outer shape obtained by simplifying the shape of the lower end plate 108. The external manifold 111 is formed to be sufficiently thicker than the lower end plate 108. For example, the external manifold 111 is made of metal.

In the external manifold 111, an anode side first flow-in port 111a, an anode side second flow-in port 111b, an anode side third flow-in port 111c, an anode side first flow-out port 111d, and an anode side second flow-out port 111e for passing of the anode gas AG are provided to be aligned relative to the cell units 100T in the stacking direction Z. In the external manifold 111, a cathode side first flow-in port 111f, a cathode side second flow-in port 111g, a cathode side first flow-out port 111h, a cathode side second flow-out port 111i, and a cathode side third flow-out port 111j for passing of the cathode gas CG are provided to be aligned relative to the cell units 100T in the stacking direction Z.

As illustrated in FIGS. 1 and 2, the cover 112 covers the cell stack assembly 100M to protect it.

The cover 112 and the external manifold 111 sandwich the cell stack assembly 100M from the upper and lower sides. The cover 112 has a box shape and a lower portion thereof is opened. For example, the cover 112 is made of metal and an inner surface is insulated by an insulator.

(Configuration of Adjustment Portion 200 Provided in Fuel Cell 100)

FIG. 16 is a perspective view illustrating an example in which auxiliary flow passages T11 and T12 are provided as components of the adjustment portion 200. FIG. 17 illustrates a center portion in a state where the metal-supported cell assemblies 101, the separators 102, and the current collection assisting layers 103 are stacked one on top of another and corresponds to a cross-sectional view illustrating a state where the auxiliary flow passage T11 is provided in the center portion as the component of the adjustment portion 200.

The adjustment portion 200 is formed of, for example, the auxiliary flow passages T11 and T12 formed of spaces (gaps). The auxiliary flow passage T11 and the like which are components of the adjustment portion 200 are provided in the separator 102 as illustrated in FIGS. 12 to 15, in addition to FIGS. 16 and 17. The auxiliary flow passage T11 located at a right end of the left flow passage portion 102L in FIG. 16 is a flow passage facing an end portion (right end) of the corresponding power generation cell 101M and corresponds to a flow passage relatively close to the anode side second flow-in port 102*b* and the cathode side second flow-out port 102*i*. The auxiliary flow passage T12 located at a left end of the left flow passage portion 102L in FIG. 16 is a flow passage facing an end portion (left end) of the corresponding power generation cell 101M and corresponds to a flow passage relatively close to the anode side third flow-in port 102*c* and the cathode side third flow-out port 102*j*. The auxiliary flow passage T12 located at a right end of the right flow passage portion 102L in FIG. 16 is a flow passage facing an end portion (right end) of the corresponding power generation cell 101M and corresponds to a flow passage relatively close to the anode side first flow-in port 102*a* and the cathode side first flow-out port 102*h*. The auxiliary flow passage T11 located at a left end of the right flow passage portion 102L in FIG. 16 is a flow passage facing an end portion (left end) of the corresponding power generation cell 101M and corresponds to the flow passage relatively close to the anode side second flow-in port 102*b* and the cathode side second flow-out port 102*i*.

(Flows of Gases in Fuel Cell 100)

Figure 18A:
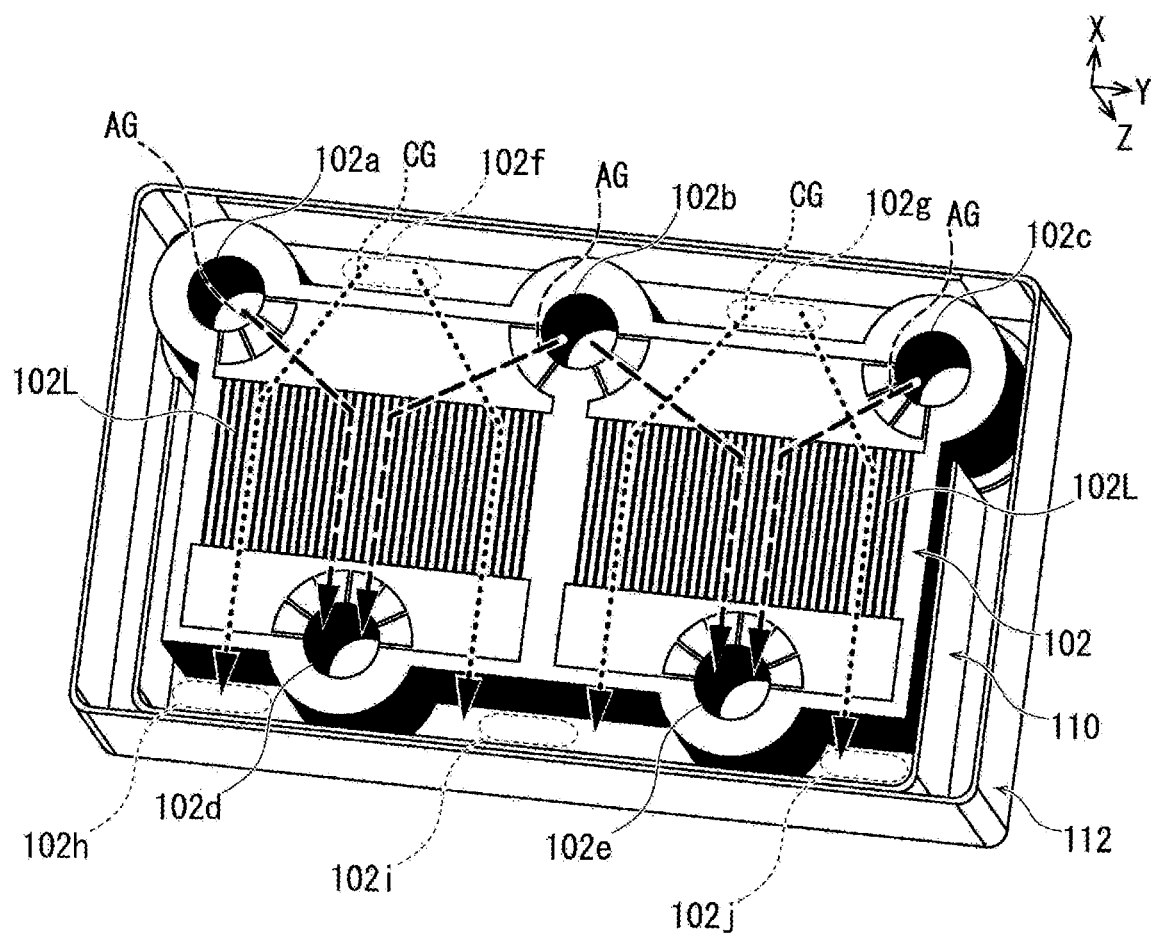
FIG. 18A is a perspective view schematically illustrating flows of an anode gas and a cathode gas in the fuel cell.
Figure 18B:
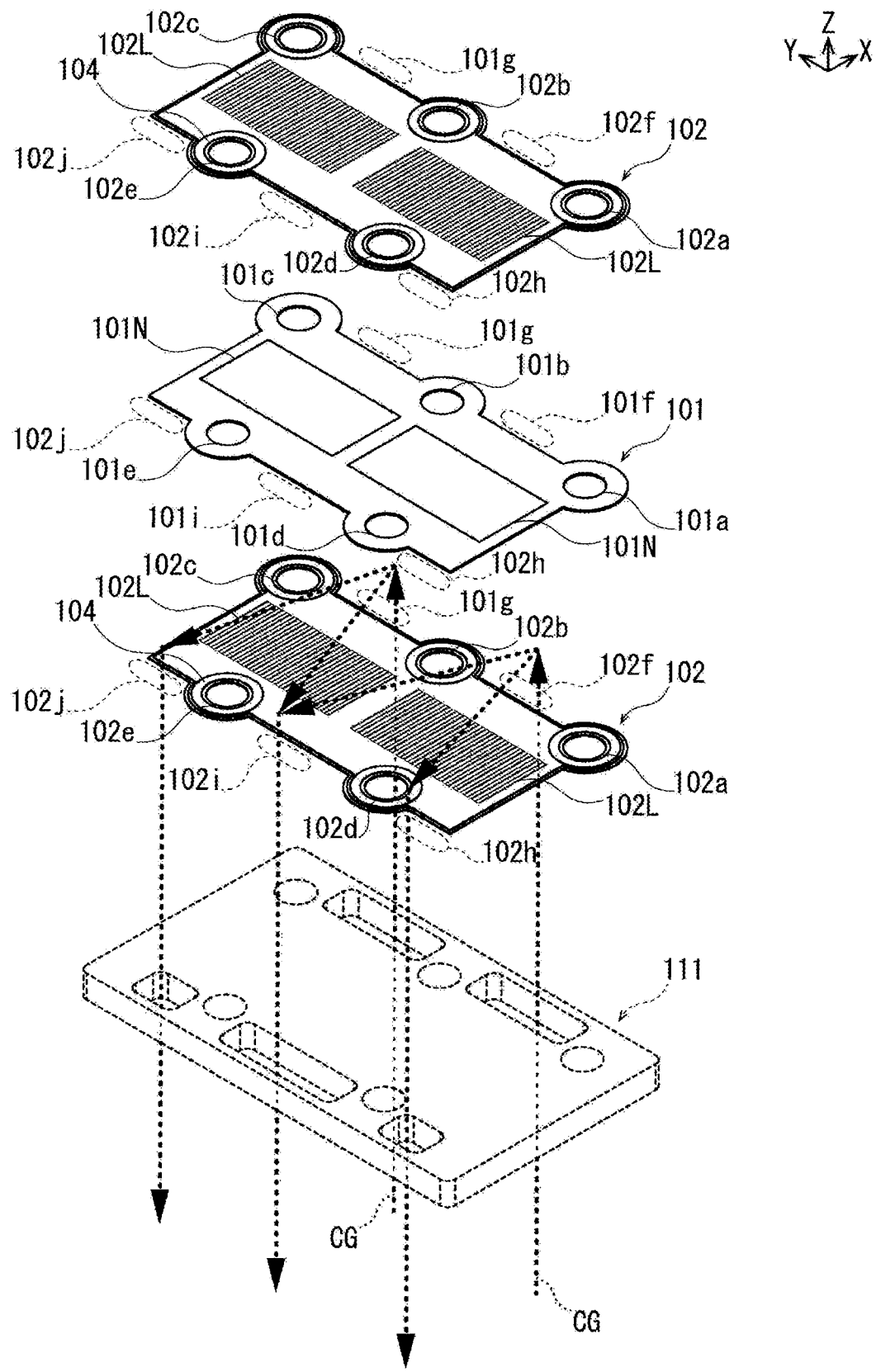
FIG. 18B is a perspective view schematically illustrating flows of the cathode gas in the fuel cell.
Figure 18C:
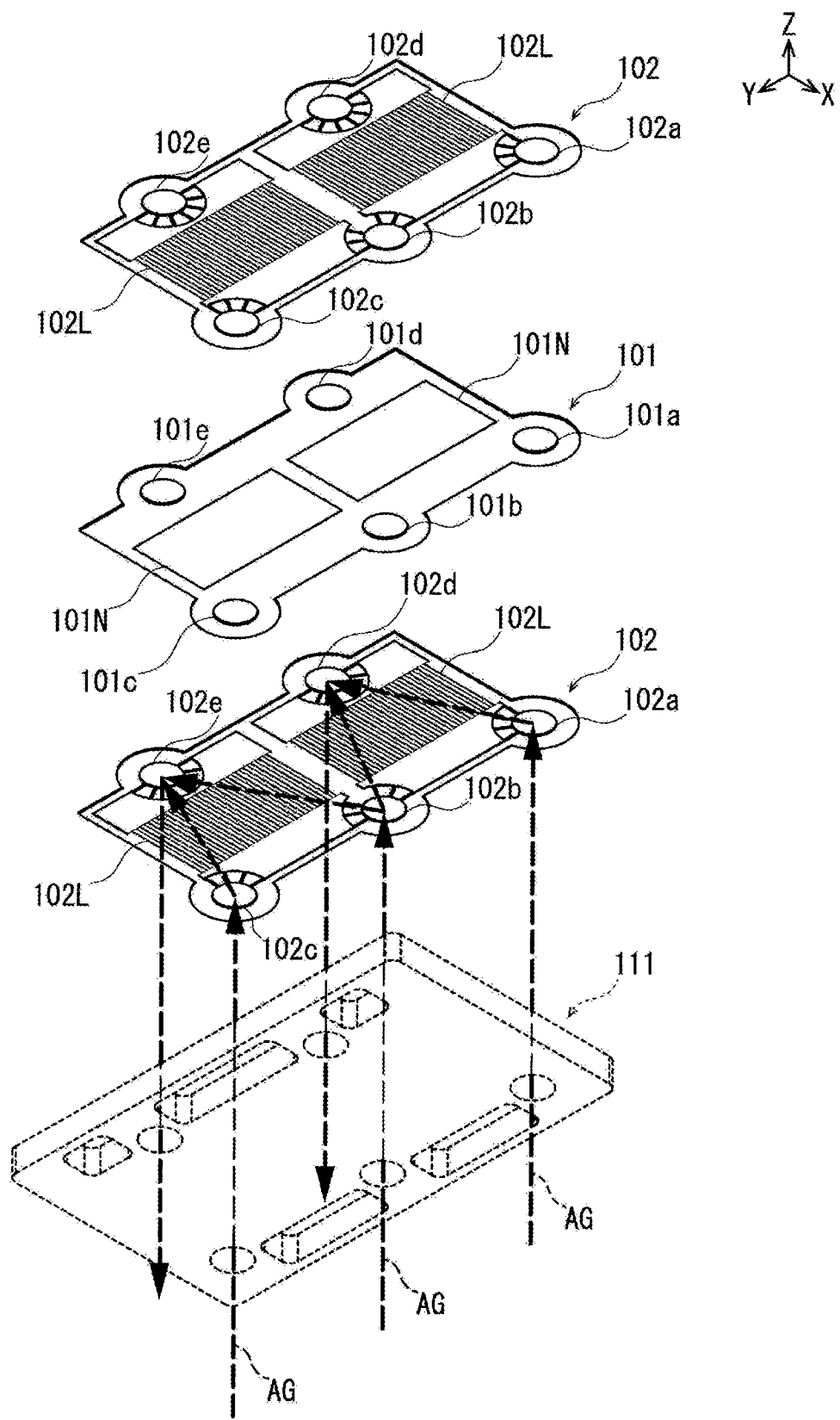
FIG. 18C is a perspective view schematically illustrating flows of the anode gas in the fuel cell.

FIG. 18A is a perspective view schematically illustrating flows of the anode gas AG and the cathode gas CG in the fuel cell 100. FIG. 18B is a perspective view schematically illustrating flows of the cathode gas CG in the fuel cell 100. FIG. 18C is a perspective view schematically illustrating flows of the anode gas AG in the fuel cell 100.

The anode gas AG passes through the flow-in ports of the external manifold 111, the lower end plate 108, the module ends 105, the separators 102, and the metal-supported cell assemblies 101 and is supplied to the anodes 101T of the power generation cells 101M. Specifically, the anode gas AG is supplied from the external manifold 111 to the upper current collection plate 106 being the terminal end while being distributed to the anode side flow passages provided in the gaps between the separators 102 and the metal-supported cell assemblies 101 alternately stacked one on top of another. Thereafter, the anode gas AG reacts in the power generation cells 101M, passes through the flow-out ports of the aforementioned components, and is discharged in a state of exhaust gas.

As illustrated in FIG. 18A, the anode gas AG is supplied to the flow passage portions 102L while being isolated from the cathode gas CG such that a path of the anode gas AG intersects a path of the cathode gas CG. In FIG. 18C, the anode gas AG passes through the anode side first flow-in port 102*a*, the anode side second flow-in port 102*b*, and the anode side third flow-in port 102*c* of the separator 102 located on the lower side in FIG. 18C, passes through the anode side first flow-in port 101*a*, the anode side second flow-in port 101*b*, and the anode side third flow-in port 101*c* of the metal-supported cell assembly 101, and then flows into the flow passage portions 102L of the separator 102 located on the upper side in FIG. 18C to be supplied to the anodes 101T of the power generation cells 101M of the metal-supported cell assembly 101. The anode gas AG having reacted in the anodes 101T flows out from the flow passage portions 102L of the separator 102 located on the upper side in FIG. 18C in the state of exhaust gas, passes through the anode side first flow-out port 101*d* and the anode side second flow-out port 101*e* of the metal-supported cell assembly 101, and passes through the anode side first flow-out port 102*d* and the anode side second flow-out port 102*e* of the separator 102 located on the lower side in FIG. 18C to be discharged to the outside.

The cathode gas CG passes through the flow-in ports of the external manifold 111, the lower end plate 108, the module ends 105, the separators 102, and the metal-supported cell assemblies 101 and is supplied to the cathodes 101U of the power generation cells 101M. Specifically, the cathode gas CG is supplied from the external manifold 111 to the upper current collection plate 106 being the terminal end while being distributed to the cathode side flow passages provided in the gaps between the metal-supported cell assemblies 101 and the separators 102 alternately stacked one on top of another. Thereafter, the cathode gas CG reacts in the power generation cells 101M, passes through the flow-out ports of the aforementioned components, and is discharged in the state of exhaust gas. The flow-in ports and the flow-out ports of the cathode gas CG in the aforementioned components are formed by the gaps between the outer peripheral surfaces of the aforementioned components and the inner surface of the air shelter 110.

In FIG. 18B, the cathode gas CG passes through the cathode side first flow-in port 102*f* and the cathode side second flow-in port 102*g* of the separator 102 located on the lower side in FIG. 18B and flows into the flow passage portions 102L of the separator 102 to be supplied to the cathodes 101U of the power generation cells 101M in the metal-supported cell assembly 101. The cathode gas CG having reacted in the cathodes 101U flows out from the flow passage portions 102L of the separator 102 located on the lower side in the FIG. 18B in the state of exhaust gas and passes through the cathode side first flow-out port 102*h*, the cathode side second flow-out port 102*i*, and the cathode side third flow-out port 102*j* of the separator 102 to be discharged to the outside.

Operations and effects of the aforementioned first embodiment are described.

The unit structure of the fuel cell 100 includes the power generation cells 101M, the separators 102, the flow passage portions 102L, the multiple gas flow-in ports, the multiple gas flow-out ports, and the adjustment portions 200. Each of the power generation cells 101M is formed by sandwiching the electrolyte 101S between the anode 101T and the cathode 101U and generates power by using the supplied gases. Each of the separators 102 is provided between the power generation cell 101M and the power generation cell 101M and isolates the adjacent power generation cells 101M from each other. Each of the flow passage portions 102L is formed between the separator 102 and the separator 102 and is formed of the multiple flow passages configured to supply the gas to the power generation cells 101M. The multiple gas flow-in ports (for example, the anode side first flow-in port 102*a*, the anode side second flow-in port 102*b*, and the anode side third flow-in port 102*c*) cause the gas to flow into the flow passage portions 102L. The multiple gas flow-out ports (for example, the anode side first flow-out port 102*d* and the anode side second flow-out port 102*e*) cause the gas to flow out from the flow passage portions. Each of the adjustment portions 200 adjusts the amount of gas flowing through the multiple flow passages. The adjustment portion 200 adjusts the pressure loss in the flow passage portions formed between the multiple gas flow-in ports or between the multiple gas flow-out ports to reduce variation in flow among the multiple flow passages.

The method of controlling the unit structure of the fuel cell 100 is the method of controlling the unit structure of the fuel cell 100 which generates power by supplying gas to the power generation cells 101M sandwiched between the separators 102 while supplying the gas from the gas flow-in ports (for example, the anode side first flow-in port 102*a*, the anode side second flow-in port 102*b*, and the anode side third flow-in port 102*c*) to the flow passage portions 102L formed in the separators 102 and discharging the gas from the gas flow-out ports (for example, the anode side first flow-out port 102d and the anode side second flow-out port 102e). In this method of controlling the unit structure of the fuel cell 100, the flow of gas supplied from the gas flow-in ports is divided into at least two flows including a main flow flowing through the flow passage portions 102L of the separators 102 and an auxiliary flow flowing between the multiple power generation cells 101M in a common plane of the power generation cells 101M and the pressure loss of gas in the auxiliary flow is adjusted to cause the gas to be evenly distributed in the common plane in the main flow.

In the method of controlling the unit structure of the fuel cell 100, the common plane of the power generation cells 101M indicates that the multiple power generation cells 101M are arranged side by side on the same separator 102. Moreover, in the method of controlling the unit structure of the fuel cell 100, causing the gas to be evenly distributed in the common plane in the main flow means reducing the variation in flow rate of gas. Reducing the variation in flow rate of gas means making the flow rates in the respective flow passages close to a common flow rate by adjusting the flows of gas in the respective flow passages of the separator 102 to the same flow velocity, pressure, density, and the like.

The unit structure of the fuel cell 100 and the method of controlling the unit structure of the fuel cell 100 described above can reduce the variation in flow among the multiple flow passages. Specifically, the unit structure of the fuel cell 100 can evenly supply gas to the power generation cells 101M. Accordingly, the unit structure of the fuel cell 100 can sufficiently improve power generation efficiency.

Figure 19:
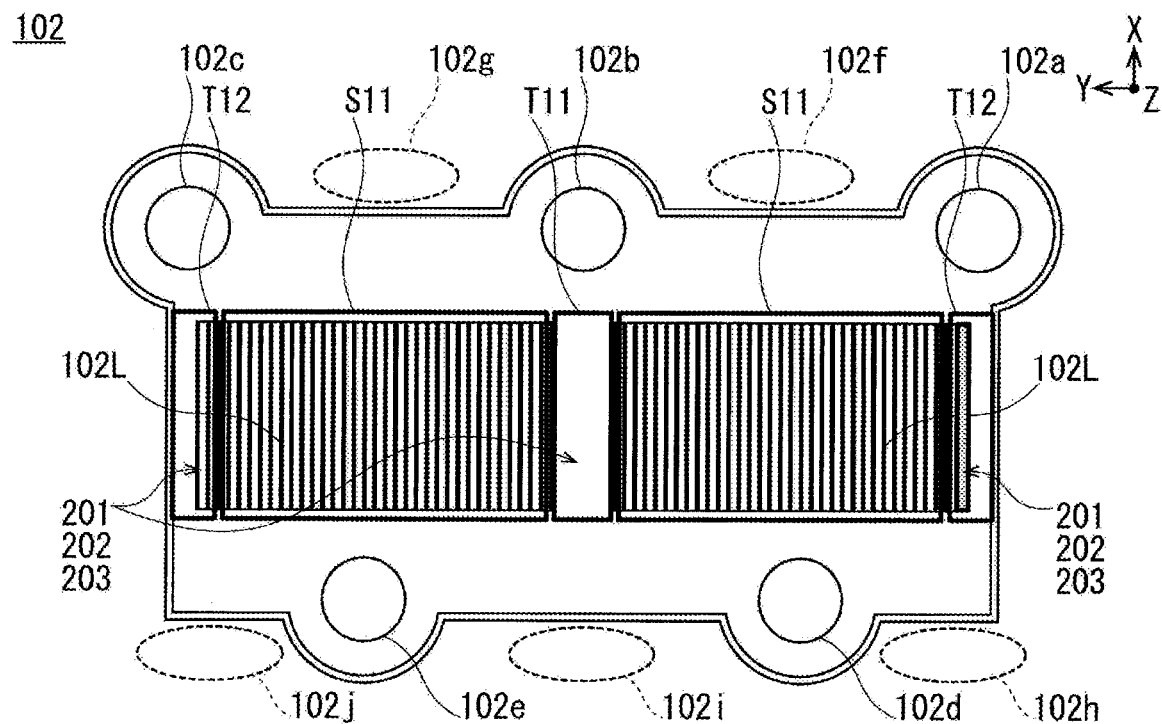
FIG. 19 is an upper view schematically illustrating a flow of gas in a main flow passage of the separator and flows of gas in auxiliary flow passages from the cathode side.

Particularly, in a configuration as illustrated in FIG. 19, the unit structure of the fuel cell 100 described above can reduce variation in gas supplied to a center portion (for example, a portion facing a main flow passage S11) of each power generation cell 101M and end portions (for example, portions facing the auxiliary flow passages T11 and T12) of the power generation cell 101M by adjusting the amount of gas supplied to the end portions (for example, the portions facing the auxiliary flow passages T11 and T12) of the power generation cell 101M. Specifically, the unit structure of the fuel cell 100 can increase or decrease the flow (main flow) of gas flowing through the center portion of the power generation cell 101M by controlling the flows (side flows) of gas flowing through the end portions of the power generation cell 101M and thereby reduce the variation in gas to be supplied to the center portion and the end portions of the power generation cell 101M. As a result, the unit structure of the fuel cell 100 can evenly supply gas to the center portion and the end portions of the power generation cell 101M. Accordingly, the unit structure of the fuel cell 100 can sufficiently improve the power generation efficiency.

Moreover, the unit structure of the fuel cell 100 described above can suppress a decrease in power generation performance by preventing the case where gas is partially insufficiently supplied to the power generation cell 101M. Accordingly, the unit structure of the fuel cell 100 can sufficiently improve the power generation efficiency.

Moreover, the unit structure of the fuel cell 100 described above can reduce the amount of gas flowing out without reacting by preventing the case where gas is partially excessively supplied to the power generation cell 101M. The smaller the variation in distribution of gas supplied to the power generation cell 101M is, the smaller the amount of excessively supplied gas can be made. Applying the configuration of the embodiment reduces the variation in distribution of gas supplied to the power generation cell 101M by about 14% on the anode side and by about 12% on the cathode side. Accordingly, the unit structure of the fuel cell 100 can sufficiently improve the power generation efficiency.

Moreover, since the unit structure of the fuel cell 100 described above can evenly supply gas to the power generation cell 101M, variation in temperature distribution of gas can be reduced when high-temperature gas is supplied. Accordingly, the unit structure of the fuel cell 100 can sufficiently improve the power generation efficiency.

In the unit structure of the fuel cell 100, the number of gas flow-in ports is preferably different from the number of gas flow-out ports.

In the unit structure of the fuel cell 100 described above, the flow-in ports (for example, the anode side first flow-in port 102a, the anode side second flow-in port 102b, and the anode side third flow-in port 102c) and the flow-out port (for example, the anode side first flow-out port 102d and the anode side second flow-out port 102e) are provided to be offset from one another. This can make the pressure losses of gas flowing through the multiple flow passages even and reduce the variation in gas flowing through the multiple flow passages. Specifically, the unit structure of the fuel cell 100 can make the amount of the gas supplied to the end portions (for example, the portions facing the auxiliary flow passages T11 and T12) of the power generation cell 101M and the amount of gas supplied to the center portion (for example, the portion facing the main flow passage S11) of the power generation cell 101M even. Accordingly, the unit structure of the fuel cell 100 can sufficiently improve the power generation efficiency.

In the unit structure of the fuel cell 100, each adjustment portion 200 is preferably the auxiliary flow passage T11 and formed between opposed surfaces of the multiple power generation cells 101M arranged such that the multiple power generation cells 101M are opposed to each other on the common plane.

In the unit structure of the fuel cell 100 described above, the auxiliary flow passage T11 can be formed between the opposed surfaces of the multiple power generation cells 101M in a simple configuration.

In the unit structure of the fuel cell 100, each adjustment portion 200 is preferably the auxiliary flow passage T12 formed between the end portion of the cell frame 101W and the surface of at least one of the power generation cells 101M not opposed to the other power generation cell 101M.

The unit structure of the fuel cell 100 described above can adjust the amount of gas supplied to the auxiliary flow passage T12 between the end portion of the cell frame 101W and the surface of the power generation cell 101M not opposed to the other power generation cell 101M and supply a proper amount of gas to the center portion (for example, the portion facing the main flow passage S11) sufficiently contributing to the power generation of the power generation cell 101M. Accordingly, the unit structure of the fuel cell 100 can sufficiently improve the power generation efficiency.

In the unit structure of the fuel cell 100, each adjustment portion 200 preferably adjusts the amounts of gas flowing through the power generation cells arranged side by side.

In the unit structure of the fuel cell 100 described above, it is possible to divide an active areas into small active areas (form the necessary active areas by using multiple power generation cells 101M) and reduce the variation of gas in each divided active areas. Accordingly, the unit structure of the fuel cell 100 can sufficiently improve the power generation efficiency.

In the unit structure of the fuel cell 100, each adjustment portion 200 preferably adjusts the amount of gas flowing between the adjacent power generation cells.

Moreover, in the unit structure of the fuel cell 100, each adjustment portion 200 preferably adjusts the amount of gas flowing on at least one side of the adjacent power generation cells.

The unit structure of the fuel cell 100 described above can supply a proper amount gas to the center portions of the power generation cells 101M sufficiently contributing to the power generation of the power generation cells 101M by adjusting the amount of gas supplied to, for example, the end portions of the power generation cells 101M (for example, the portions facing the auxiliary flow passages T11 and T12). Accordingly, the unit structure of the fuel cell 100 can sufficiently improve the power generation efficiency.

Second Embodiment

A fuel cell of a second embodiment controls flows of gas in an active area region by using adjustment portions 201 to 203 illustrated in FIGS. 19 to 24B.

(Control of Flows of Gas using Adjustment Portions 201 to 203)

Figure 20:
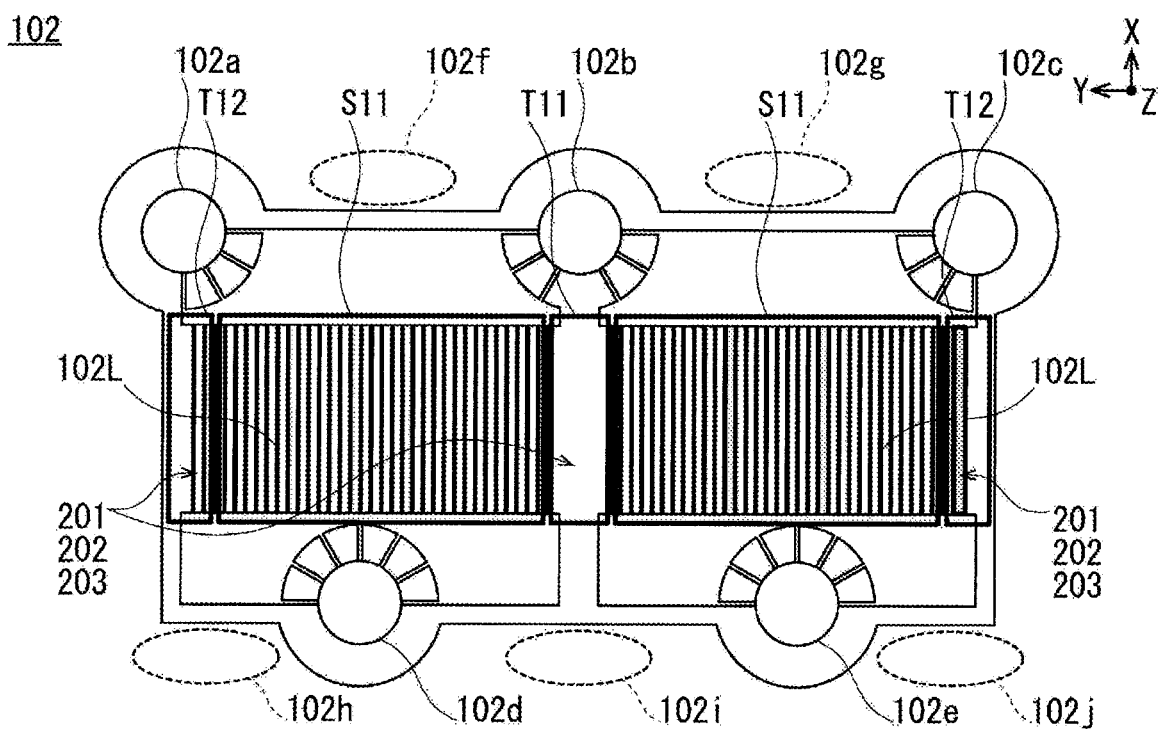
FIG. 20 is an upper view schematically illustrating the flow of gas in the main flow passage of the separator and the flows of gas in the auxiliary flow passages from the anode side.

FIG. 19 is an upper view schematically illustrating flows of gas in the main flow passages S11 of the separator 102 and flows of gas in the auxiliary flow passages T11 and T12 of the separator 102 from the cathode side. FIG. 20 is an upper view schematically illustrating the flows of gas in the main flow passages S11 of the separator 102 and the flows of gas in the auxiliary flow passages T11 and T12 of the separator 102 from the anode side.

As illustrated in FIGS. 19 and 20, the paired flow passage portions 102L of the separator 102 are provided with the main flow passages S11 facing the paired power generation cells 101M (not illustrated) and the auxiliary flow passages T11 and T12.

The main flow passages S11 located at the centers of the respective paired flow passage portions 102L in FIG. 19 correspond to flow passages facing center portions of the respective paired power generation cells 101M.

The auxiliary flow passage T11 located at the right end of the left flow passage portion 102L in FIG. 19 is the flow passage facing the end portion (right end) of the corresponding power generation cell 101M and corresponds to the flow passage relatively close to the anode side second flow-in port 102b and the cathode side second flow-out port 102i. The auxiliary flow passage T12 located at the left end of the left flow passage portion 102L in FIG. 19 is the flow passage facing the end portion (left end) of the corresponding power generation cell 101M and corresponds to the flow passage relatively close to the anode side third flow-in port 102c and the cathode side third flow-out port 102j.

The auxiliary flow passage T12 located at the right end of the right flow passage portion 102L of FIG. 19 is the flow passage facing the end portion (right end) of the corresponding power generation cell 101M and corresponds to the flow passage relatively close to the anode side first flow-in port 102a and the cathode side first flow-out port 102h. The auxiliary flow passage T11 located at the left end of the right flow passage portion 102L of FIG. 19 is the flow passage facing the end portion (left end) of the corresponding power generation cell 101M and corresponds to the flow passage relatively close to the anode side second flow-in port 102b and the cathode side second flow-out port 102i.

Figure 21A:
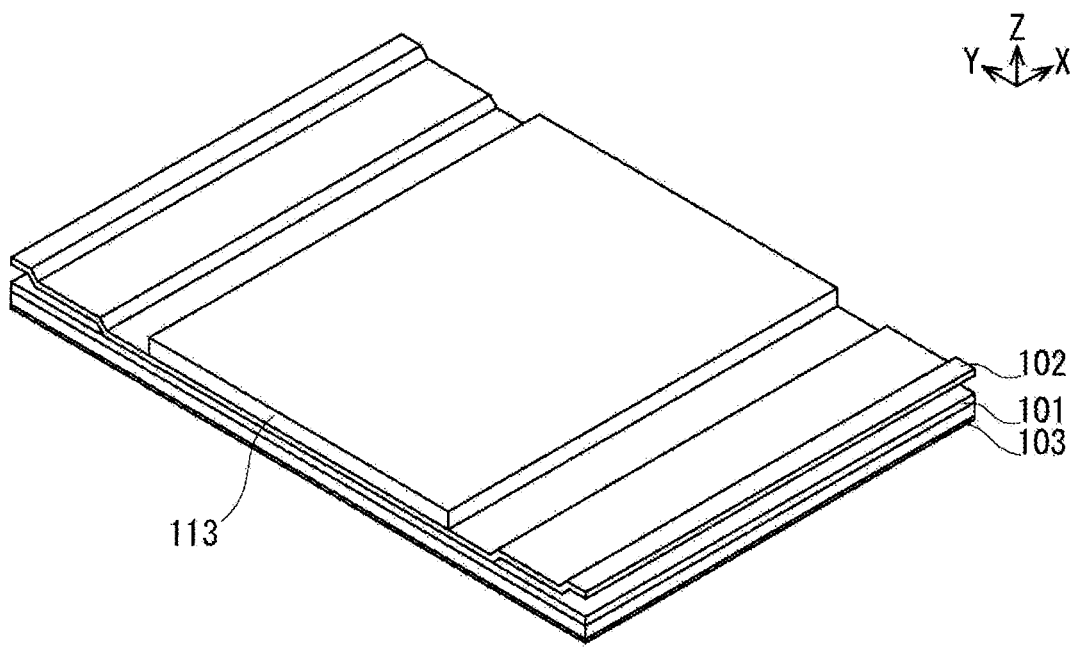
FIG. 21A is a perspective view illustrating Example 1 of the adjustment portion provided in the auxiliary flow passages for a fuel cell of a second embodiment.
Figure 21B:
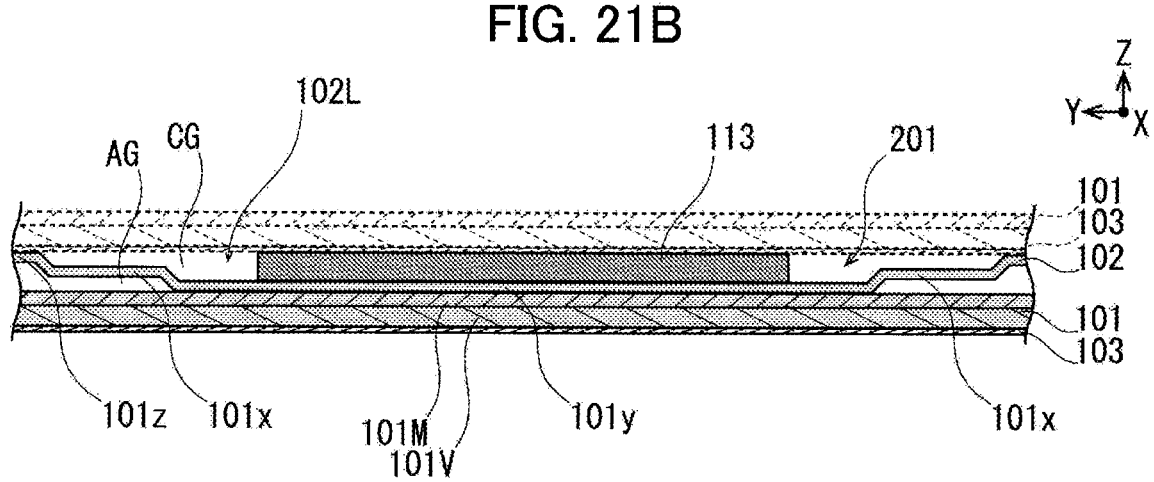
FIG. 21B is a cross-sectional view illustrating Example 1 of the adjustment portion provided in the auxiliary flow passages.
Figure 22A:
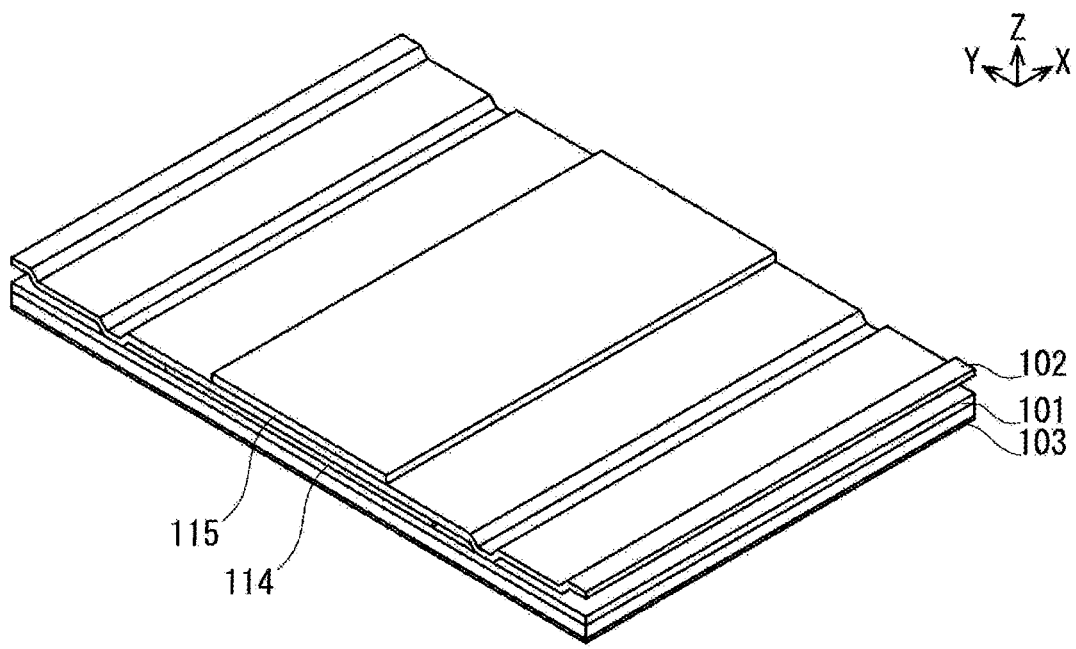
FIG. 22A is a perspective view illustrating Example 2 of the adjustment portion provided in the auxiliary flow passages.
Figure 22B:
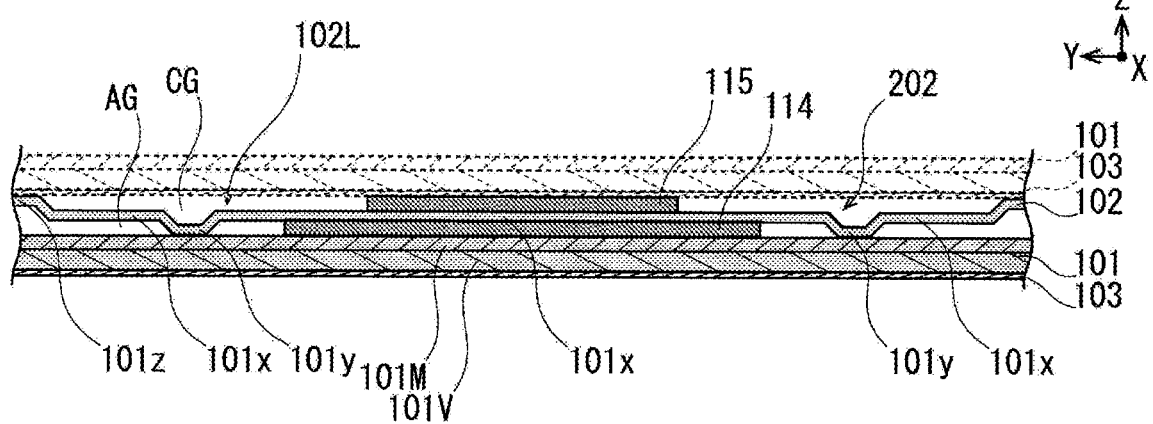
FIG. 22B is a cross-sectional view illustrating Example 2 of the adjustment portion provided in the auxiliary flow passages.
Figure 23A:
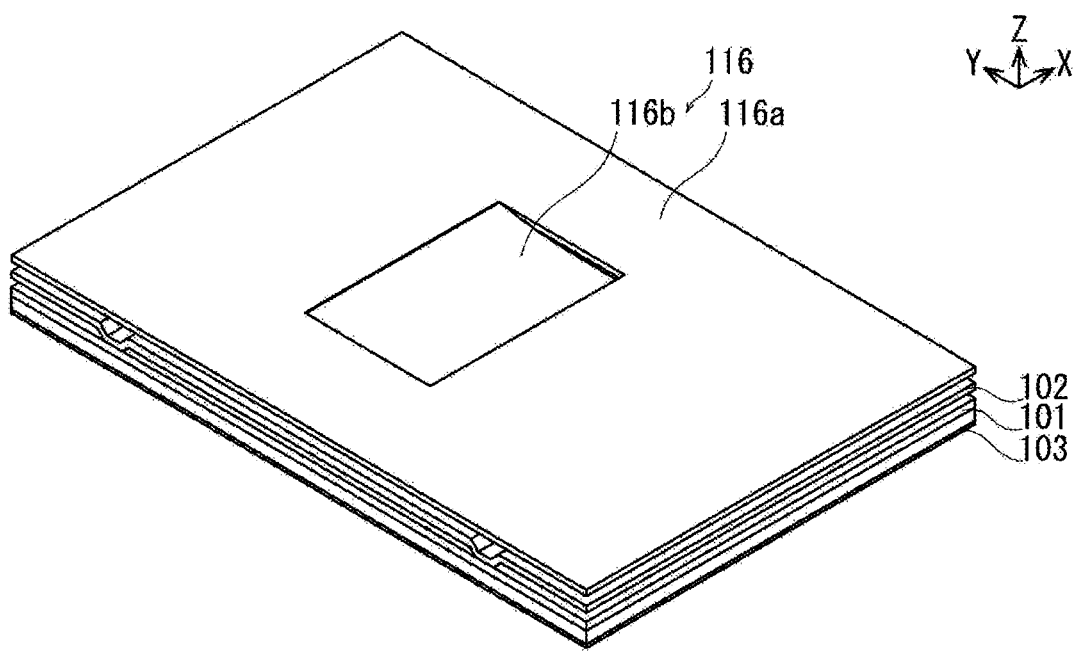
FIG. 23A is a perspective view illustrating Example 3 of the adjustment portion provided in the auxiliary flow passages.
Figure 23B:
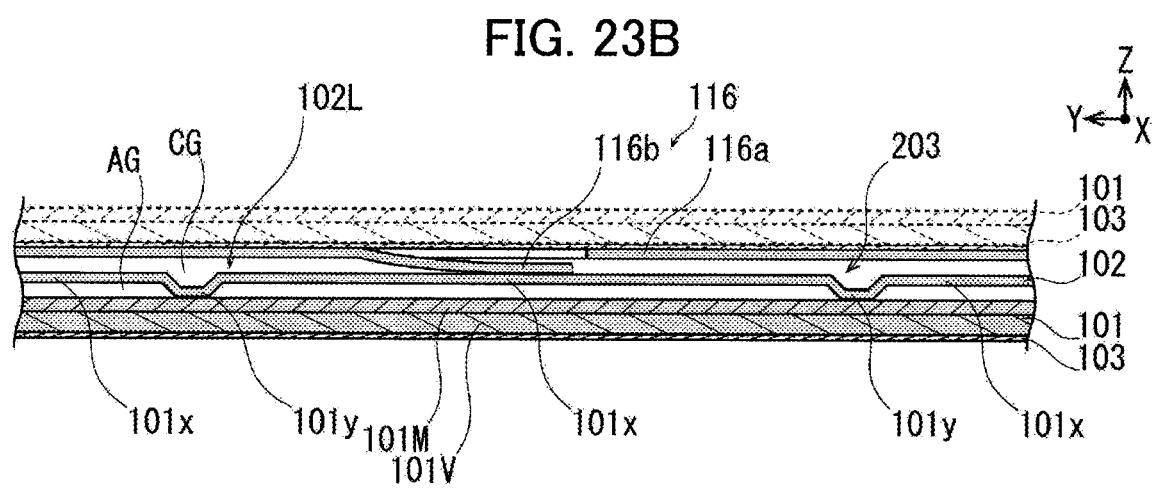
FIG. 23B is a cross-sectional view illustrating Example 3 of the adjustment portion provided in the auxiliary flow passages.
Figure 24A:
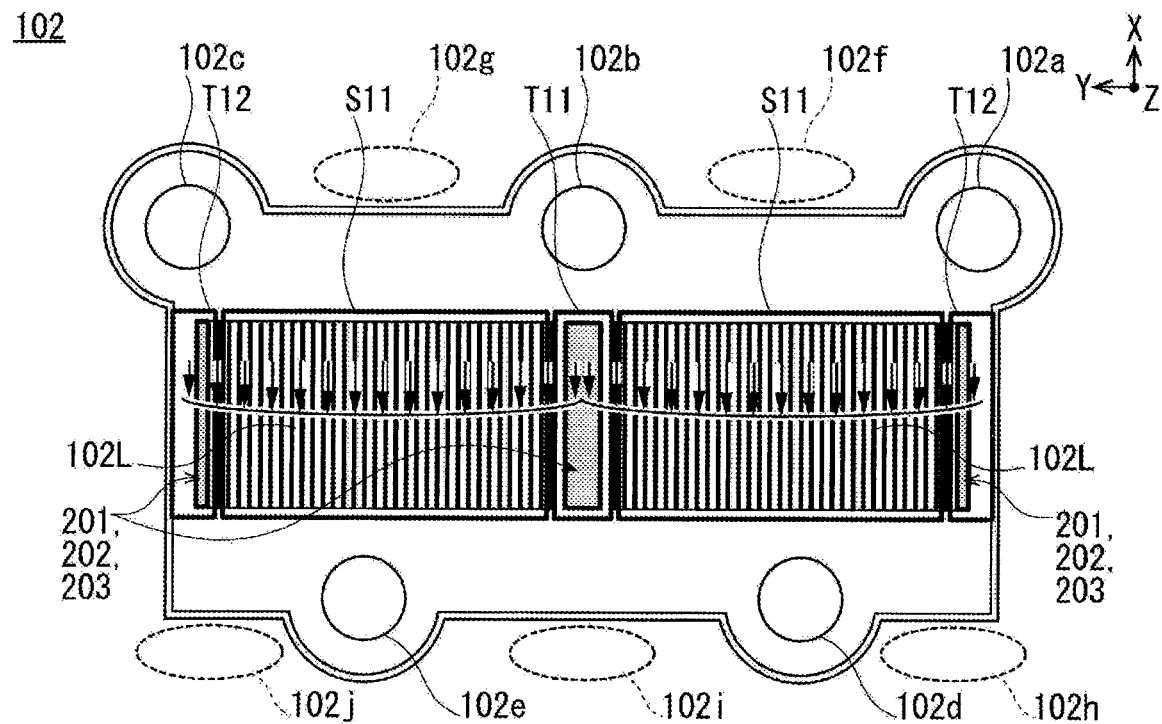
FIG. 24A is an upper view schematically illustrating a configuration in which the adjustment portion of any of FIGS. 21A to 23B is provided over the entire (from an upstream end to a downstream end of) auxiliary flow passages.
Figure 24B:
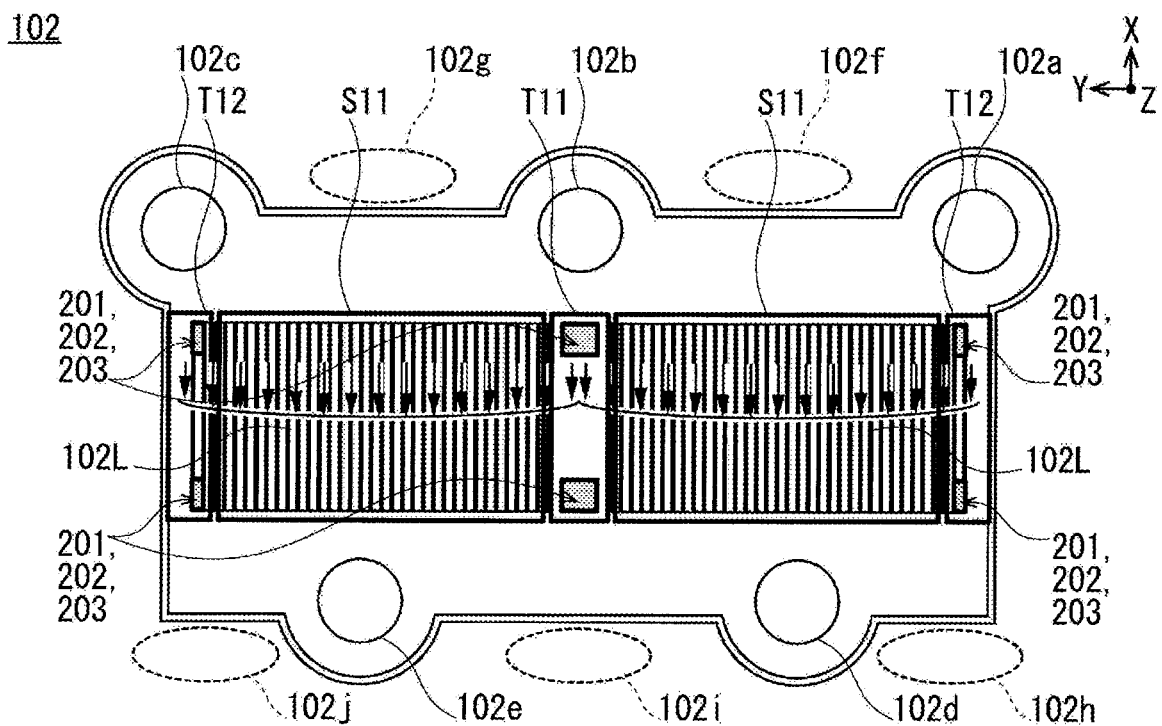
FIG. 24B is an upper view schematically illustrating a configuration in which the adjustment portion of any of FIGS. 21A to 23B is provided in part (in upstream and downstream portions) of the auxiliary flow passages.

FIG. 21A is a perspective view illustrating Example 1 of the adjustment portion 201 provided in the auxiliary flow passages T11 and T12 for the fuel cell of the second embodiment. FIG. 21B is a cross-sectional view illustrating Example 1 of the adjustment portion 201 provided in the auxiliary flow passages T11 and T12. FIG. 22A is a perspective view illustrating Example 2 of the adjustment portion 202 provided in the auxiliary flow passages T11 and T12. FIG. 22B is a cross-sectional view illustrating Example 2 of the adjustment portion 202 provided in the auxiliary flow passages T11 and T12. FIG. 23A is a perspective view illustrating Example 3 of the adjustment portion 203 provided in the auxiliary flow passages T11 and T12. FIG. 23B is a cross-sectional view illustrating Example 3 of the adjustment portion 203 provided in the auxiliary flow passages T11 and T12. FIGS. 24A and 24B are upper views schematically illustrating a configuration in which any of the adjustment portions 201 to 203 is provided in specific portions of the auxiliary flow passages T11 and T12.

For example, the adjustment portions 201 to 203 have the configurations illustrated in FIGS. 21A to 23B and adjust the amounts of gas flowing through the multiple flow passages. The adjustment portions 201 to 203 reduce the variation in flow among the multiple flow passages by adjusting the pressure losses in the flow passage portions formed between the multiple gas flow-in ports or the multiple gas flow-out ports.

As illustrated in FIG. 19 and the like, the adjustment portions 201 to 203 are provided in the auxiliary flow passages T11 and T12 of the flow passage portion 102L. The adjustment portions 201 to 203 adjust the amount of gas flowing through the auxiliary flow passages T11 and T12 and make the amount of gas flowing through the main flow passage S11 and the amount of gas flowing through the auxiliary flow passages T11 and T12 even.

FIGS. 21A and 21B illustrate Example 1 of the adjustment portion 201. The adjustment portion 201 is provided in regions of the auxiliary flow passages T11 and T12 in the flow passage portions 102L of the separator 102. In the adjustment portion 201 the anode side projection 102y is extended in the direction (long-side direction Y) orthogonal to the direction of gas flow in the auxiliary flow passages T11 and T12 to partially reduce the cross-sectional areas of the flow passages on the anode 101T side of the power generation cell 101M. The adjustment portion 201 thereby adjusts the cross-sectional areas of the flow passages on the anode side in the auxiliary flow passages T11 and T12. In the adjustment portion 201, a sealing material 113 is provided in a gap between the anode side projection 102y and the cathode 101U of the power generation cell 101M to partially increase or decrease the cross-sectional areas of the flow passages on the cathode 101U side of the power generation cell 101M. The sealing material 113 is made of, for example, a piece of Thermiculite formed in a shape elongated along the flow passages. The adjustment portion 201 thereby adjusts the cross-sectional areas of the flow passages on the cathode side in the auxiliary flow passages T11 and T12. The adjustment portion 201 makes the amount of gas flowing through the main flow passage S11 and the amount of gas flowing through the auxiliary flow passages T11 and T12 even in the flow passage portions 102L of the separator 102 by such adjustment.

FIGS. 22A and 22B illustrate Example 2 of the adjustment portion 202. The adjustment portion 202 is provided in the regions of the auxiliary flow passages T11 and T12 of the flow passage portions 102L of the separator 102. In the adjustment portion 202, the flat portion 102x is extended by forming no anode side projection 102y and a sealing material 114 is provided in a gap between this flat portion 102x and the anode 101T of the power generation cell 101M in each of the regions of the auxiliary flow passages T11 and T12 to partially reduce the cross-sectional areas of the flow passages on the anode 101T side of the power generation cell 101M. The sealing material 114 is made of, for example, a piece of Thermiculite formed in a shape elongated along the flow passages. The adjustment portion 202 thereby adjusts the cross-sectional areas of the flow passages on the anode side in the auxiliary flow passages T11 and T12. In the adjustment portion 202, a sealing material 115 is provided in a gap between the aforementioned flat portion 102x and the cathode 101U of the power generation cell 101M to partially increase or decrease the cross-sectional areas of the flow passages on the cathode 101U side of the power generation cell 101M. The sealing material 115 is made of, for example, a piece of Thermiculite formed in a shape elongated along the flow passages. The adjustment portion 202 thereby adjusts the cross-sectional areas of the flow passages on the cathode side in the auxiliary flow passages T11 and T12. The adjustment portion 202 makes the amount of gas flowing through the main flow passage S11 and the amount of gas flowing through the auxiliary flow passages T11 and T12 even in the flow passage portions 102L of the separator 102 by such adjustment.

FIGS. 23A and 23B illustrate Example 3 of the adjustment portion 203. The adjustment portion 203 is provided in the regions of the auxiliary flow passages T11 and T12 in the flow passage portions 102L of the separator 102. In the adjustment portion 203, the flat portion 102x is extended by forming no cathode side projection 102z and a spring member 116 is provided in a gap between this flat portion 102x and the cathode 101U of the power generation cell 101M in each of the regions of the auxiliary flow passages T11 and T12 to partially increase and reduce the cross-sectional areas of the flow passages on the cathode 101U side of the power generation cell 101M. The spring member 116 is made of a thin-plate shaped piece of metal. The spring member 116 includes a flat base member 116a and elastically-deformable multiple standing pieces 116b which are formed to stand up from the base member 116a as cantilever beams. In the adjustment portion 203, the cross-sectional areas of the flow passages on the cathode side are adjusted by setting the shapes and intervals of the standing pieces 116b of the spring member 116. The adjustment portion 203 thereby adjusts the cross-sectional areas of the flow passages on the cathode side in the auxiliary flow passages T11 and T12. The adjustment portion 203 makes the amount of gas flowing through the main flow passage S11 and the amount of gas flowing through the auxiliary flow passages T11 and T12 even in the flow passage portions 102L of the separator 102 by such adjustment.

A range in which the adjustment portions 201 to 203 are provided is determined such that the pressure loss of gas in the auxiliary flow passages T11 and T12 of the separator 102 takes a certain value.

As illustrated in FIG. 24A, the adjustment portions 201 to 203 can be provided over the entire (from an upstream end to a downstream end of) auxiliary flow passages T11 and T12 of the separator 102. Such a configuration is applied when the pressure loss of gas in the auxiliary flow passages T11 and T12 of the separator 102 needs to be set relatively large.

As illustrated in FIG. 24B, the adjustment portions 201 to 203 can be provided in part (in upstream and downstream portions, only in downstream portions, or only in upstream portions) of the auxiliary flow passages T11 and T12 of the separator 102. Such a configuration is applied when the pressure loss of gas in the auxiliary flow passages T11 and T12 of the separator 102 needs to be set relatively small.

Operations and effects of the aforementioned second embodiment are described.

In the unit structure of the fuel cell 100, the adjustment portions 201 to 203 each include an additional control mechanism which adjusts the amount of gas in the auxiliary flow passages T11 and T12.

The control mechanism controls the gas by increasing of reducing the pressure loss of gas in the auxiliary flow passages T11 and T12.

In the unit structure of the fuel cell 100 described above, the amount of gas in the auxiliary flow passages T11 and T12 can be very easily controlled to any amount by using the additional member forming the fuel cell 100. The adjustment portions 201 to 203 are merely examples and can be configured by using control mechanisms of various modes.

In the unit structure of the fuel cell 100, the adjustment portions 201 to 203 are preferably provided in end portions of the power generation cells 101M, along the flow of gas.

The unit structure of the fuel cell 100 described above can, for example, supply a proper amount of gas to the center portions (for example, the portions facing the main flow passages S11) sufficiently contributing to the power generation in the power generation cells 101M by adjusting the amount of gas supplied to the end portions (for example, the portions facing the auxiliary flow passages T11 and T12) of the power generation cells 101M. Accordingly, the unit structure of the fuel cell 100 can sufficiently improve the power generation efficiency.

In the unit structure of the fuel cell 100, the adjustment portions 201 to 203 are preferably configured such that the pressure loss of gas flowing through flow passages (auxiliary flow passages T11 and T12) relatively close to at least the flow-in ports (for example, the anode side first flow-in port 102a, the anode side second flow-in port 102b, and the anode side third flow-in port 102c) among the multiple flow passages facing the anodes 101T of the power generation cells 101M is greater than the pressure loss of gas flowing through the other flow passages (main flow passages S11).

In the unit structure of the fuel cell 100 described above, the amount of gas supplied to the end portions (for example, the portions facing the auxiliary flow passages T11 and T12) of the power generation cells 101M can be adjusted to be prevented from being excessive and the gas can be evenly supplied to the center portions (for example, the portions facing the main flow passages S11) of the power generation cells 101M and the end portions (for example, the portions facing the auxiliary flow passages T11 and T12) of the power generation cells 101M. Accordingly, the unit structure of the fuel cell 100 can sufficiently improve the power generation efficiency.

In the unit structure of the fuel cell 100, the adjustment portions 201 to 203 are preferably configured such that the cross-sectional areas of at least the flow passage (auxiliary flow passages T11 and T12) relatively close to the flow-in ports (for example, the anode side first flow-in port 102a, the anode side second flow-in port 102b, and the anode side third flow-in port 102c) are smaller than the cross-sectional areas of the other flow passages (main flow passages S11).

In the unit structure of the fuel cell 100 described above, a very simple configuration adjusting the cross-sectional areas of the flow passages can adjust the amount of gas supplied to the end portions (for example, the portions facing the auxiliary flow passages T11 and T12) of the power generation cells 101M to prevent the amount from being excessive, and cause the gas to be evenly supplied to the center portions (for example, the portions facing the main flow passages S11) of the power generation cells 101M and the end portions (for example, the portions facing the auxiliary flow passages T11 and T12) of the power generation cells 101M. Accordingly, the unit structure of the fuel cell 100 can sufficiently improve the power generation efficiency.

Third Embodiment

A fuel cell of a third embodiment is different from the aforementioned fuel cell of the second embodiment in that adjustment portions 401 to 404 illustrated in FIGS. 25A to 25D control the flows of gas in regions away from the active areas corresponding to the regions of the power generation cells 101M. In the aforementioned second embodiment, the adjustment portions 201 to 203 illustrated in FIGS. 21A to 23B control the flows of gas in the active area regions.

The adjustment portions 401 to 404 illustrated in FIGS. 25A to 25D are formed by providing protrusion-shaped portions 301s to 304s in a region (auxiliary flow passages T63 to T93 illustrated in FIGS. 26A and 26B) located between paired flow passage portions 301L of a separator 301. Specifically, the adjustment portions 401 to 404 are provided in portions of separators 301 to 304 not facing the power generation cells 101M. The auxiliary flow passages T63 to T93 illustrated in FIGS. 26A and 26B correspond to the flow passage relatively close to at least the flow-in ports (for example, the cathode side first flow-in port and the cathode side second flow-in port) among the multiple flow passages facing the cathodes 101U of the power generation cells 101M. The adjustment portions 401 to 404 mainly control the flow of the cathode gas CG in the auxiliary flow passages T63 to T93 illustrated in FIGS. 26A and 26B which are regions away from the active areas in which the power generation cells 101M are present.

Figure 25A:
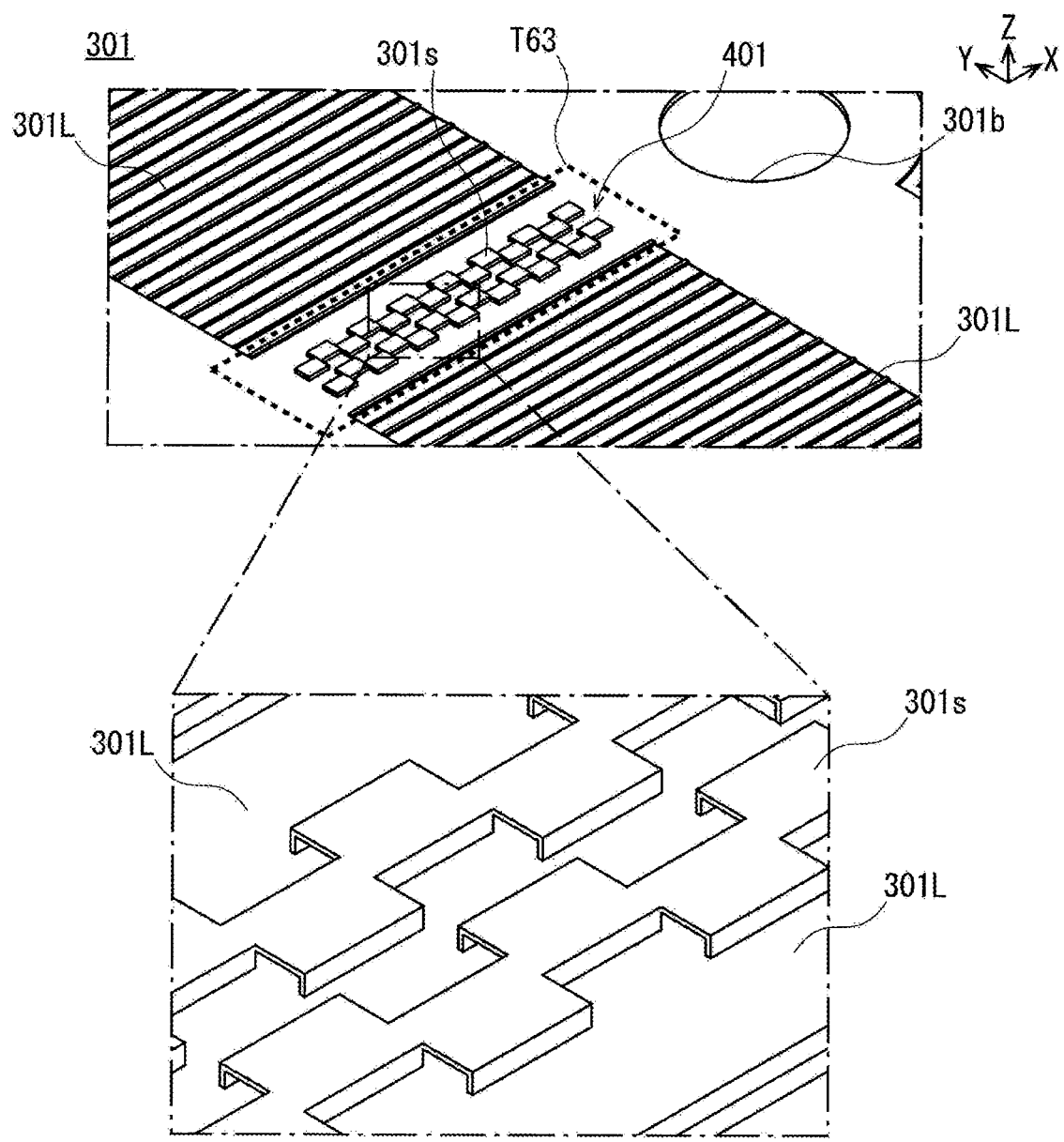
FIG. 25A is a perspective view illustrating Example 1 of the adjustment portion provided in the auxiliary flow passage of the separator for a fuel cell of a third embodiment.

FIG. 25A illustrates Example 1 of the adjustment portion 401 provided in the auxiliary flow passage T63 of the separator 301. The adjustment portion 401 includes the protrusion-shaped portions 301s formed in the region (auxiliary flow passage T63) located between the paired flow passage portions 301L of the separator 301. The protrusion-shaped portions 301s are each formed such that rectangular projections with through holes extending in the direction (short-side direction X) of gas flow are continuously arrayed in the short-side direction X while being alternately shifted by half-pitch in the direction (long-side direction Y) orthogonal to the direction of gas flow. Paired protrusion-shaped portions 301s are provided in the direction (long-side direction Y) orthogonal to the direction of gas flow. The pressure loss of gas in the auxiliary flow passage T63 can be set to any amount by adjusting the shape of the protrusion-shaped portions 301s. In the adjustment portion 401, the protrusion-shaped portions 301s may be formed as members separate from the separator 301 and joined to the auxiliary flow passage T63 of the separator 301.

Figure 25B:
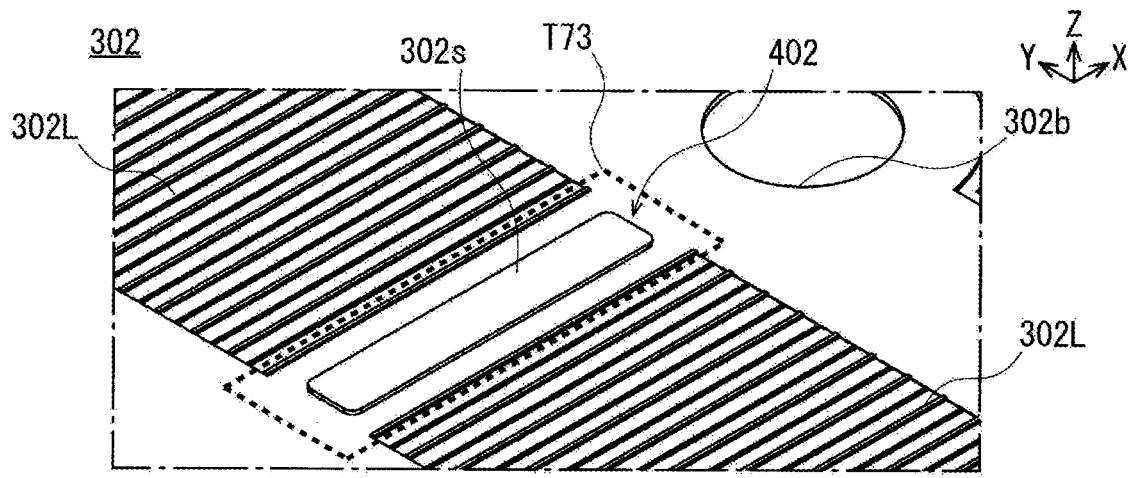
FIG. 25B is a perspective view illustrating Example 2 of the adjustment portion provided in the auxiliary flow passage of the separator.

FIG. 25B illustrates Example 2 of the adjustment portion 402 provided in the auxiliary flow passage T73 of the separator 302. The adjustment portion 402 is formed of the protrusion-shaped portion 302s formed in the region (auxiliary flow passage T73) located between the paired flow passage portions 302L of the separator 302. The protrusion-shaped portion 302s is formed in a rectangular shape elongated in the direction (short-side direction X) of gas flow. The pressure loss of gas in the auxiliary flow passage T73 can be set to any amount by adjusting the shape of the protrusion-shaped portion 302s. The protrusion-shaped portion 302s can be easily shaped in the separator 302 by pressing or the like. In the adjustment portion 402, the protrusion-shaped portion 302s may be formed as a member separate from the separator 302 and joined to the auxiliary flow passage T73 of the separator 302.

Figure 25C:
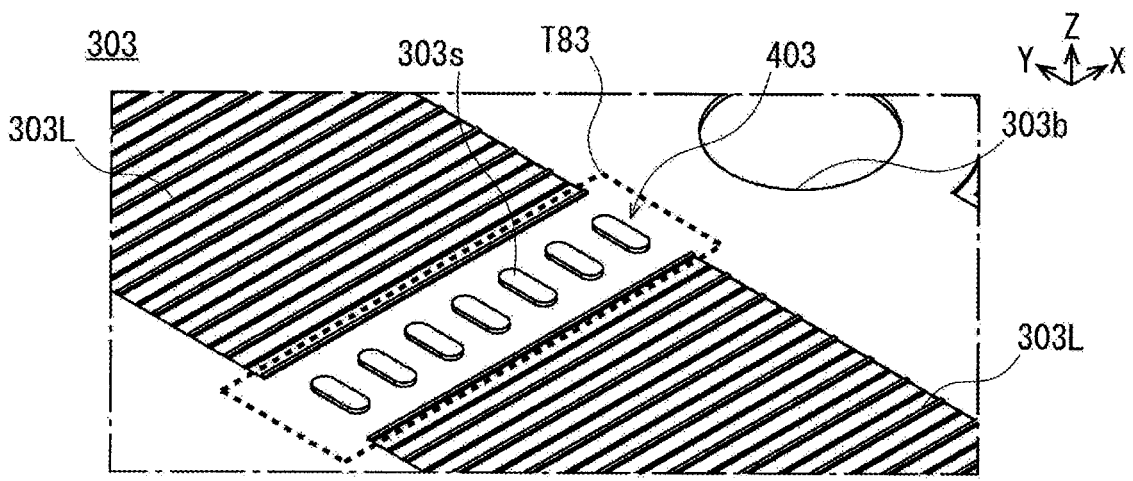
FIG. 25C is a perspective view illustrating Example 3 of the adjustment portion provided in the auxiliary flow passage of the separator.

FIG. 25C illustrates Example 3 of the adjustment portion 403 provided in the auxiliary flow passage T83 of the separator 303. The adjustment portion 403 is formed of the protrusion-shaped portions 303s formed in the region (auxiliary flow passage T83) located between the paired flow passage portions 303L of the separator 303. The protrusion-shaped portions 303s are each formed in a rectangular shape elongated in the direction (long-side direction Y) orthogonal to the direction of gas flow. Multiple protrusion-shaped portions 303s are provided at fixed intervals in the direction (short-side direction X) of gas flow. The pressure loss of gas in the auxiliary flow passage T83 can be set to any amount by adjusting the number, intervals, and shape of the protrusion-shaped portions 303s. The protrusion-shaped portions 303s tend to keep their shape when the temperature of the separator 303 becomes high. In the adjustment portion 403, the protrusion-shaped portions 303s may be formed as members separate from the separator 303 and joined to the auxiliary flow passage T83 of the separator 303.

Figure 25D:
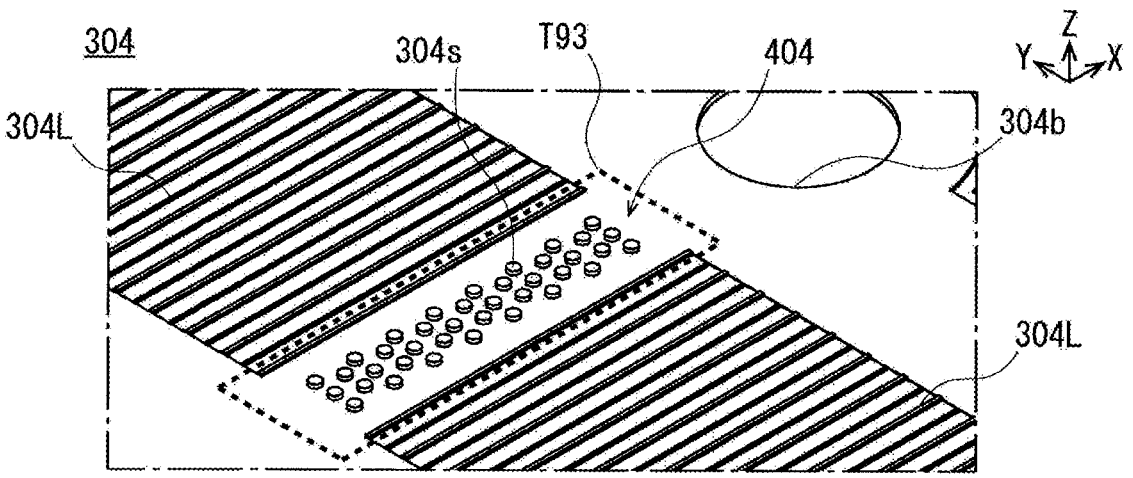
FIG. 25D is a perspective view illustrating Example 4 of the adjustment portion provided in the auxiliary flow passage of the separator.

FIG. 25D illustrates Example 4 of the adjustment portion 404 provided in the auxiliary flow passage T93 of the separator 304. The adjustment portion 404 is formed of protrusion-shaped portions 304s formed in the region (auxiliary flow passage T93) located between the paired flow passage portions 304L of the separator 304. The protrusion-shaped portions 304s are formed in a columnar shape. Multiple protrusion-shaped portions 304s are formed in the direction (short-side direction X) of gas flow in a lattice pattern. The pressure loss of gas in the auxiliary flow passage T93 can be set to any amount by adjusting the number, intervals, and shape of the protrusion-shaped portions 304s. The protrusion-shaped portions 304s tend to keep their shape when the temperature of the separator 304 becomes high. The protrusion-shaped portions 304s can be easily formed with different configurations (numbers, intervals, and shapes) on the anode side and the cathode side of the separator 304. In the adjustment portion 404, the protrusion-shaped portions 304s may be formed as members separate from the separator 304 and joined to the auxiliary flow passage T93 of the separator 304.

A range in which the adjustment portions 401 to 404 illustrated in FIGS. 25A to 25D are provided is determined such that the pressure loss of gas in the auxiliary flow passages T63, T73, T83, and T93 of the separators 301 to 304 takes a certain value.

Figure 26A:
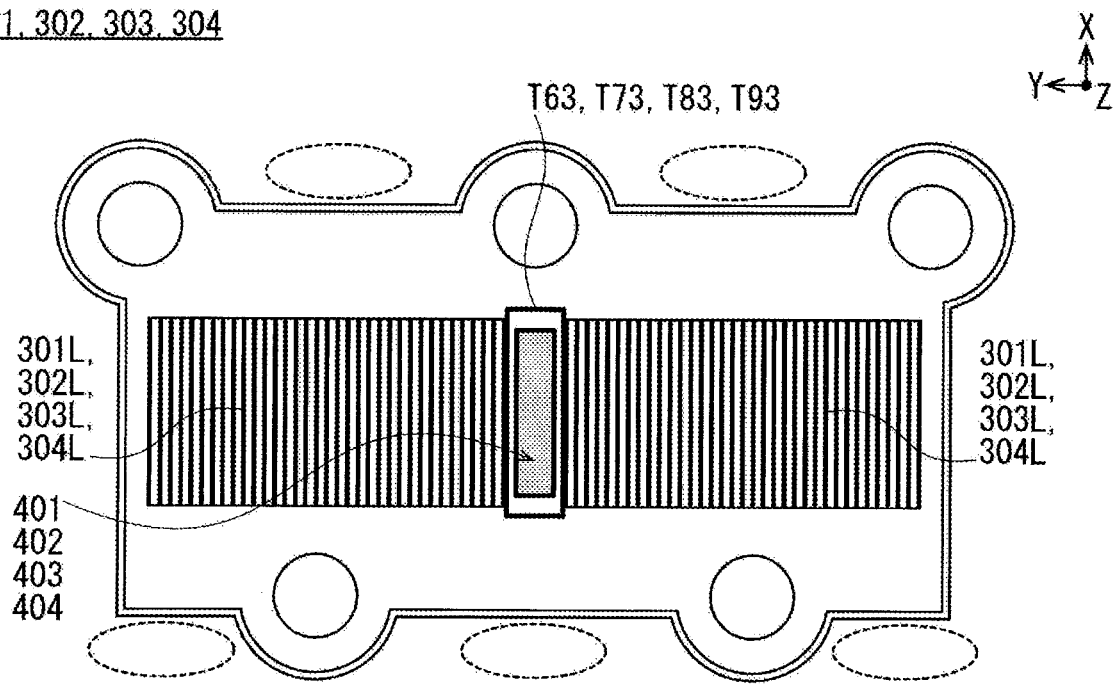
FIG. 26A is an upper view schematically illustrating a configuration in which the adjustment portion of any of FIGS. 25A to 25D is provided over the entire (from an upstream end to a downstream end of) auxiliary flow passage.

As illustrated in FIG. 26A, the adjustment portions 401 to 404 can be provided over the entire (from an upstream end to a downstream end of) auxiliary flow passages T63, T73, T83, and T93 of the separators 301 to 304. Such a configuration is applied when the pressure loss of gas in the auxiliary flow passages T63, T73, T83, and T93 of the separators 301 to 304 needs to be set relatively large.

Figure 26B:
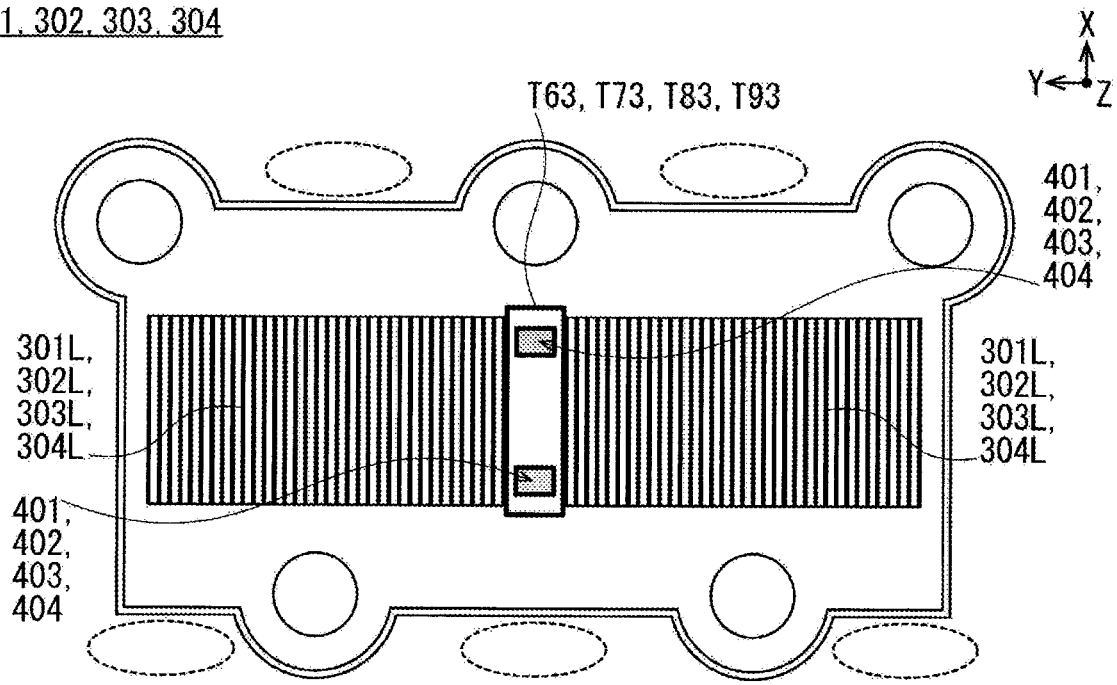
FIG. 26B is an upper view schematically illustrating a configuration in which the adjustment portion of any of FIGS. 25A to 25D is provided in part (in upstream and downstream portions) of the auxiliary flow passage.

As illustrated in FIG. 26B, the adjustment portions 401 to 404 can be provided in part (in upstream and downstream portions, only in downstream portions, or only in upstream portions) of the auxiliary flow passages T63, T73, T83, and T93 of the separators 301 to 304. Such a configuration is applied when the pressure loss of gas in the auxiliary flow passages T63, T73, T83, and T93 of the separators 301 to 304 needs to be set relatively small.

Operations and effects of the aforementioned third embodiment are described.

In the fuel cell unit structure, for example, in the separator 301, when the pressure loss of gas flowing through the flow passage (auxiliary flow passage T63) relatively close to at least the flow-in ports (for example, the cathode side first flow-in port and the cathode side second flow-in port) among the multiple flow passages facing the cathodes 101U of the power generation cells 101M is greater than the pressure loss of gas flowing through the other flow passages (main flow passages), for example, the adjustment portion 401 is preferably configured as follows. Specifically, the adjustment portion 401 is configured such that the cross-sectional area of the flow passage (auxiliary flow passage T63) relatively close to at least the flow-in port (for example, the cathode side first flow-in port and the cathode side second flow-in port) is larger than the cross-sectional area of the other flow passages (main flow passages).

The fuel cell unit structure described above can make the amount of the cathode gas CG supplied to the end portions of the cathodes 101U of the power generation cells 101M and the amount of the cathode gas CG supplied to the center portions of the cathodes 101U of the power generation cells 101M even. Accordingly, the fuel cell unit structure can reduce the temperature gradient of the cathode gas CG (prevent generation of excessive thermal stress) in the end portions of the cathodes 101U of the power generation cells 101M when the cathode gas CG to be supplied to the cathodes 101U of the power generation cells 101M is heated for rapid start (warm-up). Accordingly, the fuel cell unit structure can sufficiently improve the power generation efficiency while being capable of efficiently performing rapid start (warm-up) with effects of thermal stress on the components due to warm-up being suppressed.

In the fuel cell unit structure, for example, in the separator 301, when the pressure loss of gas flowing through the flow passage (auxiliary flow passage T63) relatively close to at least the flow-in ports (for example, the cathode side first flow-in port and the cathode side second flow-in port) among the multiple flow passages facing the cathodes 101U of the power generation cells 101M is smaller than the pressure loss of gas flowing through the other flow passages (main flow passage), for example, the adjustment portion 401 is preferably configured as follows. Specifically, the adjustment portion 401 is configured such that the pressure loss in the flow passage (auxiliary flow passage T63) relatively close to at least the flow-in port (for example, the cathode side first flow-in port and the cathode side second flow-in port) is larger than the pressure loss of gas flowing through the other flow passages (main flow passages).

The fuel cell unit structure described above can make the amount of the cathode gas CG supplied to the end portions of the cathodes 101U of the power generation cells 101M and the amount of the cathode gas CG supplied to the center portions of the cathodes 101U of the power generation cells 101M even. Accordingly, the fuel cell unit structure can sufficiently improve the power generation efficiency while being capable of efficiently performing rapid start (warm-up) with effects of thermal stress on the components due to warm-up being suppressed.

Fourth Embodiment

A fuel cell unit structure of a fourth embodiment is different from the aforementioned fuel cells of the first and third embodiments in the arrangement of the flow passage portions and supply portions (the flow-in ports and the flow-out ports) provided in the separator.

Figure 27A:
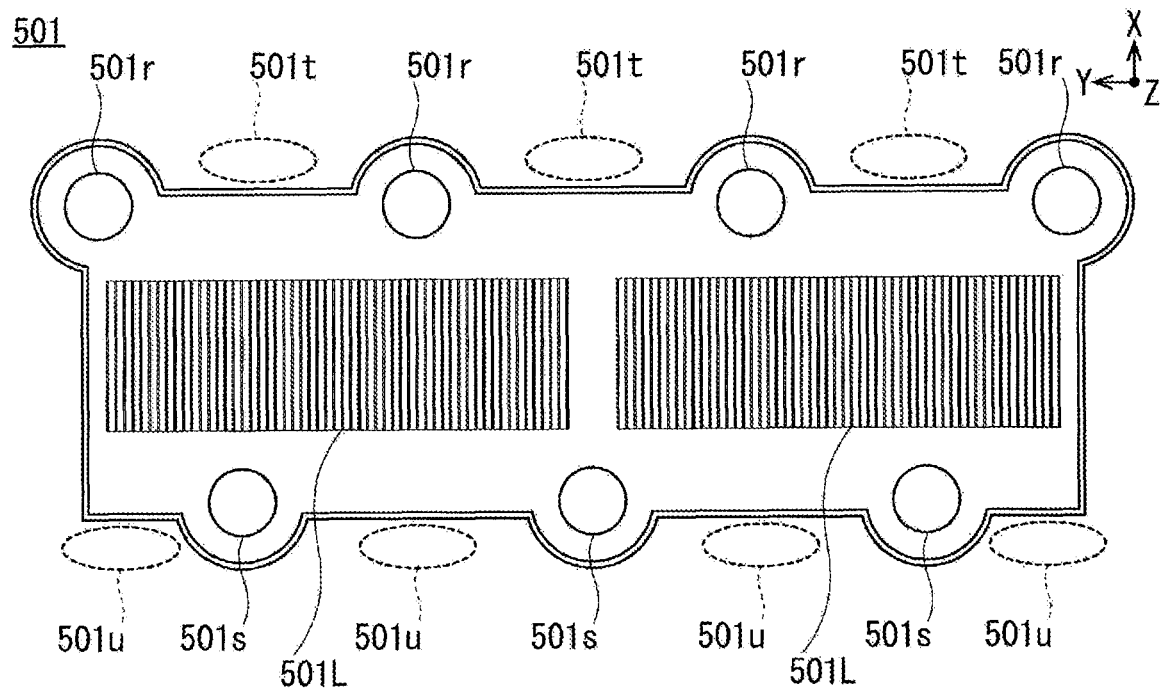
FIG. 27A is an upper view schematically illustrating Arrangement Example 1 of flow passage portions and supply portions provided in the separator for a fuel cell of a fourth embodiment.

FIG. 27A illustrates Arrangement Example 1 of flow passage portions S01L and supply portions (the flow-in ports and the flow-out ports) provided in a separator 501. In the configuration of FIG. 27A, four anode side flow-in ports 501r and three cathode side flow-in ports 501t are alternately provided upstream of the two flow passage portions S01L (facing the not-illustrated power generation cells 101M respectively) arranged side by side in the left-right direction. Moreover, four cathode side flow-out ports 501u and three anode side flow-out ports 501s are alternately provided downstream of the two flow passage portions S01L arranged side by side in the left-right direction. The separator 501 is configured such that the number of the anode side flow-out ports 501s is an odd number and the number of the anode side flow-in ports 501r is an even number. In the separator 501, the anode side flow-in ports 501r and the anode side flow-out ports 501s for the anode 101T of one power generation cell 101M are provided alternately next to each other across the flow passage portions S01L, while the cathode side flow-in ports 501t and the cathode side flow-out ports 501u for the cathode 101U of another power generation cell 101M are alternately provided across the flow passage portions S01L.

Figure 27B:
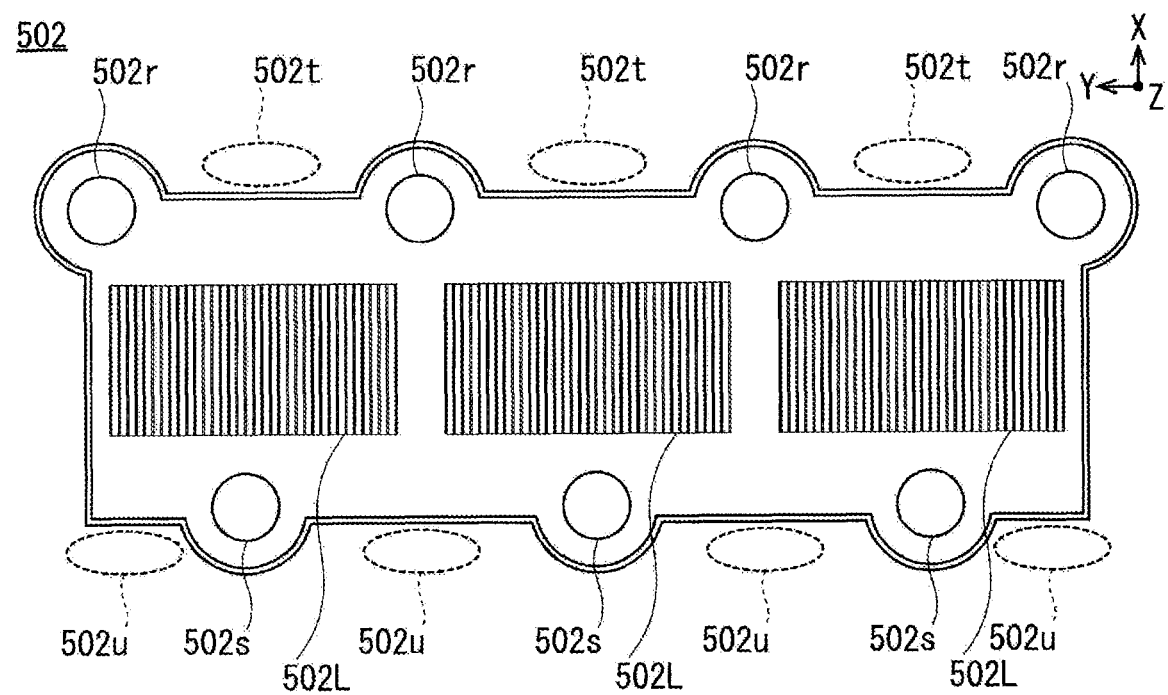
FIG. 27B is an upper view schematically illustrating Arrangement Example 2 of the flow passage portions and the supply portions provided in the separator.

FIG. 27B illustrates Arrangement Example 2 of flow passage portions 502L and supply portions (the flow-in ports and the flow-out ports) provided in a separator 502. In the configuration of FIG. 27B, four anode side flow-in ports 502r and three cathode side flow-in ports 502t are alternately provided upstream of the three flow passage portions 502L (facing the not-illustrated power generation cells 101M respectively) arranged side by side in the left-right direction. Moreover, four cathode side flow-out ports 502u and three anode side flow-out ports 502s are alternately provided downstream of the three flow passage portions 502L arranged side by side in the left-right direction. The separator 502 has the same outer shape as the separator 501. The flow passage portions 502L of the separator 502 have a shorter width in the long-side direction Y than the flow passage portions 501L of the separator 501.

Operations and effects of the aforementioned fourth embodiment are described.

In the fuel cell unit structure, for example, the supply portions provided in the separator 501 are preferably configured such that one of the number of the anode side flow-in ports 501r and the number of the anode side flow-out ports 501s (the number of the anode side flow-out ports 501s) is an odd number and the other number (the number of the anode side flow-in ports 501r) is an even number on, for example, the anode side.

In the fuel cell unit structure described above, for example, providing the anode side flow-in ports 501r and the anode side flow-out ports 501s alternately across the flow passage portions S01L can make the pressure losses of gas flowing through the multiple flow passages even and reduce the variation in gas flowing through the multiple flow passages. Specifically, the fuel cell unit structure can make the amount of gas supplied to the end portions of the power generation cells 101M and the amount of gas supplied to the center portions of the power generation cells 101M even. Accordingly, the fuel cell unit structure can sufficiently improve the power generation efficiency.

In the fuel cell unit structure, for example, the separator 501 is preferably configured such that the anode side flow-in ports 501r and the anode side flow-out ports 501s which are the supply portions for the anode 101T of one power generation cell 101M and the cathode side flow-in ports 501t and the cathode side flow-out ports 501u which are the supply portions for the cathode 101U of another power generation cell 101M are respectively alternately provided adjacent to one another.

In the fuel cell unit structure described above, providing the anode side flow-in ports and the cathode side flow-in ports alternately and providing the anode side flow-out ports and the cathode side flow-out ports alternately can make the pressure losses of gas flowing through the multiple flow passages even and reduce variation in gas flow through the multiple flow passages. Specifically, the fuel cell unit structure can make the amount of gas supplied to the end portions of the power generation cells 101M and the amount of gas supplied to the center portions of the power generation cells 101M even. Accordingly, the fuel cell unit structure can sufficiently improve the power generation efficiency.

Fifth Embodiment

An fuel cell unit structure of a fifth embodiment is different from the aforementioned fuel cells of the first to fourth embodiments in the arrangement of the flow passage portions and the supply portions (the flow-in ports and the flow-out ports) provided in the separator.

As illustrated in FIGS. 28A to 28D, the adjustment portions 201 to 203 can be applied to separators in which the flow passage portions and the supply portions (the flow-in ports and the flow-out ports) are arranged in various ways.

Figure 28A:
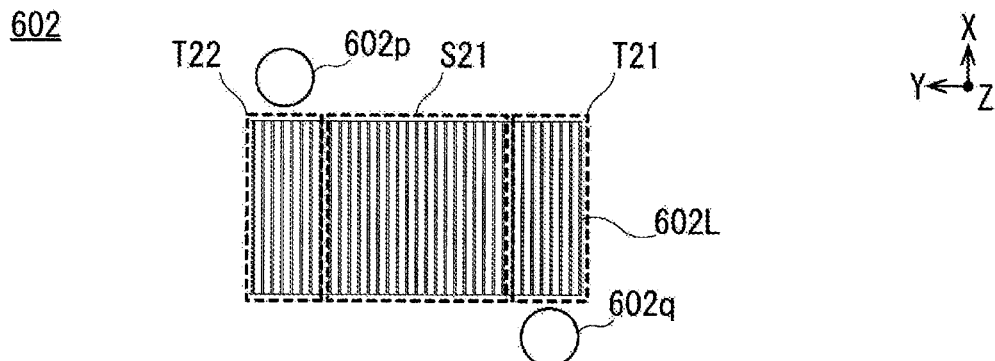
FIG. 28A is an upper view schematically illustrating the main flow passage, the auxiliary flow passages, and Arrangement Example 1 of the flow passage portion and supply portions (flow-in port and flow-out port) in a separator.

FIG. 28A illustrates Arrangement Example 1 of a flow passage portion 602L and supply portions (a flow-in port 602p and a flow-out port 602q) in a separator 602. The flow-in port 602p and the flow-out port 602q are included in regions on extensions of flow passages in the flow passage portion 602L and are provided diagonally to the flow passage portion 602L, upstream and downstream thereof. FIG. 28A illustrates a main flow passage S21 and auxiliary flow passages T21 and T22 in Arrangement Example 1. The adjustment portion adjusts the amount of gas flowing through the flow passages (the auxiliary flow passages T21 and T22) relatively close to the flow-in port 602p and the flow-out port 602q among the multiple flow passages and reduces the variation in gas flowing through the flow passages.

Figure 28B:
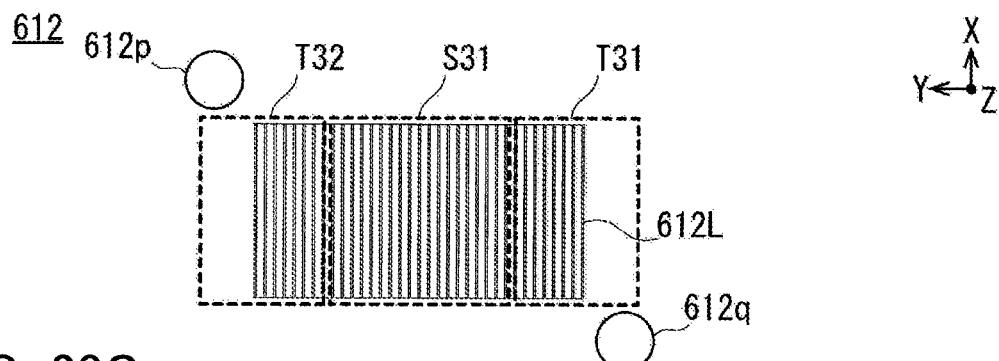
FIG. 28B is an upper view schematically illustrating the main flow passage, the auxiliary flow passages, and Arrangement Example 2 of the flow passage portion and the supply portions (flow-in port and flow-out port) in the separator.

FIG. 28B illustrates Arrangement Example 2 of a flow passage portion 612L and supply portions (a flow-in port 612p and a flow-out port 612q) in a separator 612. The flow-in port 612p and the flow-out port 612q are provided diagonally to the flow passage portion 612L, upstream and downstream thereof, away from regions on extensions of flow passages in the flow passage portion 612L. FIG. 28B illustrates a main flow passage S31 and auxiliary flow passages T31 and T32 in Arrangement Example 2. The adjustment portion adjusts the amount of gas flowing through the flow passages (auxiliary flow passages T31 and T32) relatively close to the flow-in port 612p and the flow-out port 612q among the multiple flow passages and reduces the variation in gas flowing through the flow passages.

Figure 28C:
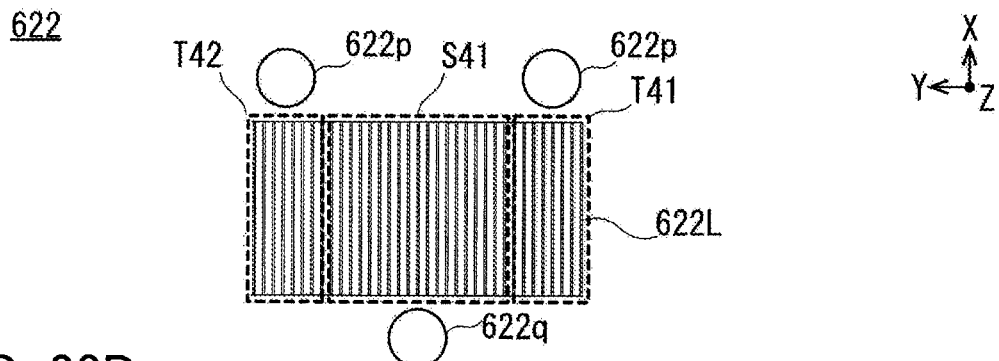
FIG. 28C is an upper view schematically illustrating the main flow passage, the auxiliary flow passages, and Arrangement Example 3 of the flow passage portion and the supply portions (flow-in ports and flow-out port) in the separator.

FIG. 28C illustrates Arrangement Example 3 of a flow passage portion 622L and supply portions (paired flow-in ports 622p and a flow-out port 622q) in a separator 622. The paired flow-in ports 622p are included in a region on extensions of flow passages in the flow passage portion 622L and are provided upstream of both ends of the flow passage portion 622L. The flow-out port 622q is included in a region on extensions of the flow passages in the flow passage portion 622L and is provided downstream of the center of the flow passage portion 622L. FIG. 28C illustrates a main flow passage S41 and auxiliary flow passages T41 and T42 in Arrangement Example 3. The adjustment portion adjusts the amount of gas flowing through the flow passages (auxiliary flow passages T41 and T42) relatively close to the paired flow-in ports 622p among the multiple flow passages and reduces the variation in gas flowing through the flow passages.

Figure 28D:
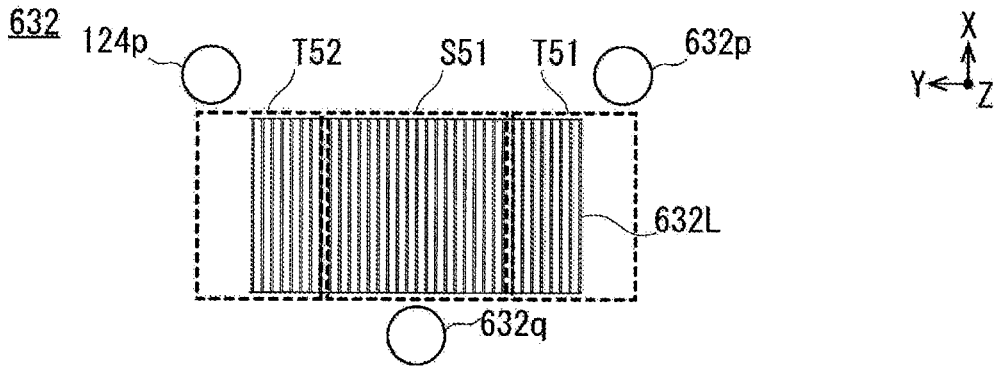
FIG. 28D is an upper view schematically illustrating the main flow passage, the auxiliary flow passages, and Arrangement Example 4 of the flow passage portion and the supply portions (flow-in ports and flow-out port) in the separator.

FIG. 28D illustrates Arrangement Example 4 of a flow passage portion 632L and supply portions (paired flow-in ports 632p and a flow-out port 632q) provided in a separator 632. The paired flow-in port 632p are provided upstream of both ends of the flow passage portion 632L, away from a region on extensions of flow passages in the flow passage portion 632L. The flow-out port 632q is included in a region on extensions of the flow passages in the flow passage portion 632L and is provided downstream of the center of the flow passage portion 632L. FIG. 28D illustrates a main flow passage S51 and auxiliary flow passages T51 and T52 in Arrangement Example 4. The adjustment portion adjusts the amount of gas flowing through the flow passages (auxiliary flow passages T51 and T52) relatively close to the paired flow-in ports 632p among the multiple flow passages and reduces the variation in gas flowing through the flow passages.

The fuel cell unit structure in the fifth embodiment described above can be applied to various configurations as illustrated in FIGS. 28A, 28B, 28C, and 28D.

Moreover, in the present invention, various changes can be made based on the configurations described in the claims and these changes are also within the scope of the present invention.

In the first to fifth embodiment, the fuel cell unit structure is described as a unit structure applied to a Solid Oxide Fuel Cell (SOFC). However, the fuel cell unit structure may be configured as a unit structure applied to a Polymer Electrolyte Membrane Fuel Cell (PEMFC), a Phosphoric Acid Fuel Cell (PAFC), or a Molten Carbonate Fuel Cell (MCFC). In other words, the fuel cell unit structure can be applied to unit structures of a Polymer Electrolyte Membrane Fuel Cell (PEMFC), a Phosphoric Acid Fuel Cell (PAFC), and a Molten Carbonate Fuel Cell (MCFC), in addition to a Solid Oxide Fuel Cell (SOFC).

In the first to fifth embodiments, the multiple flow passages provided in the flow passage portions are described as multiple spaces obtained by physically partitioning the flow passages from one another by protruding and recess shapes. However, the flow passages may be formed as one space without being physically partitioned from one another.

In the first to fifth embodiments, the cathode side supply portions are described to have a configuration open in the fuel cell. However, the cathode side supply portions may be configured like the anode side supply portions.

The fuel cell unit structure may be formed by appropriately combining specifications of the first to fifth embodiments.

REFERENCE SIGNS LIST 100 fuel cell
100M cell stack assembly
100S stack
100T cell unit
100U joined body
100P upper module unit
100Q middle module unit 100R lower module unit
101 metal-supported cell assembly
101M power generation cell
101N metal-supported cell
101S electrolyte
101T anode (fuel electrode)
101U cathode (oxidant electrode)
101V support metal
101W cell frame
101k opening portion
101p first extending portion
101q second extending portion
101r third extending portion
101s fourth extending portion
101t fifth extending portion
102 separator
102L flow passage portion
102p outer edge
102q groove
102x flat portion
102y anode side projection
102z cathode side projection
103 current collection assisting layer
104 sealing member
105 module end
106 upper current collection plate
107 lower current collection plate
108 lower end plate
109 upper end plate
110 air shelter
111 external manifold
101a, 102a, 105a, 107a, 108a, 111a anode side first flow-in port
101b, 102b, 105b, 107b, 111b, 108b anode side second flow-in port
101c, 102c, 105c, 107c, 111c, 108c anode side third flow-in port
101d, 102d, 108d, 107d, 111d, 105d anode side first flow-out port
101e, 102e, 105e, 107e, 111e, 108e anode side second flow-out port
101f, 108f, 102f, 105f, 107f, 111f cathode side first flow-in port
101g, 102g, 105g, 107g, 108g, 111g cathode side second flow-in port
101h, 102h, 111h, 105h, 107h, 108h cathode side first flow-out port
101i, 102i, 105i, 107i, 108i, 111i cathode side second flow-out port
101j, 102j, 105j, 107j, 108j, 111j cathode side third flow-out port
112 cover
113, 114, 115 sealing material
116 spring member
116a base member
116b standing piece
200, 201, 202, 203 adjustment portion
301, 302, 303, 304 separator
301L, 302L, 303L, 304L flow passage portion
301s, 302s, 303s, 304s protrusion-shaped portion
401, 402, 403, 404 adjustment portion
501, 502 separator
501L, 502L flow passage portion
501r, 502r anode side flow-in port
501s, 502s anode side flow-out port
501t, 502t cathode side flow-in port
501u, 502u cathode side flow-out port
602, 612, 622, 632 separator
602L, 612L, 622L, 632L flow passage portion
602p, 612p, 622p, 632p flow-in port
602q, 612q, 622q, 632q flow-out port
S11, S21, S31, S41, S51 main flow passage
T11, T12, T21, T22, T31, T32, T41, T42, T51, T52, T63, T73, T83, T93 auxiliary flow passage
V joining line V
AG anode gas
CG cathode gas
X short-side direction (of fuel cell)
Y long-side direction (of fuel cell)
Z stacking direction (of fuel cell)

The invention claimed is:

1. A fuel cell unit structure comprising:
power generation cells each including an electrolyte sandwiched between a fuel electrode and an oxidant electrode and each configured to generate power by using supplied gas;
separators each provided between the power generation cell and the power generation cell and configured to isolate the adjacent power generation cells from each other;
a flow passage portion formed between the separator and the separator and including flow passages configured to supply the gas to the power generation cells;
gas flow-in ports configured to allow the gas to flow into the flow passage portion;
gas flow-out ports configured to allow the gas to flow out from the flow passage portion; and
an adjustment portion configured to adjust an amount of the gas flowing through the flow passages,
wherein the adjustment portion comprises a first auxiliary flow passage provided between the power generation cells arranged to be opposed to each other on a same plane with a gas flow-in port of the gas flow-in ports being located on an extended line of an extending direction of the first auxiliary flow passage.

2. The fuel cell unit structure according to claim 1, wherein a number of the gas flow-in ports is different from a number of the gas flow-out ports.

3. The fuel cell unit structure according to claim 1, wherein the adjustment portion comprises a second auxiliary flow passage formed between a cell frame end portion and a surface of at least one of the power generation cells not opposed to the other power generation cell.

4. The fuel cell unit structure according to claim 1, wherein the adjustment portion comprises an additional control mechanism configured to adjust an amount of the gas in the first auxiliary flow passage.

5. The fuel cell unit structure according to claim 4, wherein the adjustment portion comprises an additional control mechanism configured to adjust an amount of the gas in the second auxiliary flow passage.

6. The fuel cell unit structure according to claim 5, wherein the control mechanism is configured to control the gas by increasing or reducing a pressure loss of the gas.

7. The fuel cell unit structure according to claim 2, wherein one of a number of the gas flow-in ports and a number of the gas flow-out ports is an odd number and the other number is an even number.

8. The fuel cell unit structure according to claim 2, wherein the gas flow-in ports and the gas flow-out ports for the fuel electrode of one of the power generation cells and the gas flow-in ports and the gas flow-out ports for the oxidant electrode of another one of the power generation cells are respectively alternately provided adjacent to one another.

9. A fuel cell unit structure comprising:
power generation cells each including an electrolyte sandwiched between a fuel electrode and an oxidant electrode and each configured to generate power by using supplied gas;
separators each provided between the power generation cell and the power generation cell and configured to isolate the adjacent power generation cells from each other;
a flow passage portion formed between the separator and the separator and including flow passages configured to supply the gas to the power generation cells;
gas flow-in ports configured to allow the gas to flow into the flow passage portion;
gas flow-out ports configured to allow the gas to flow out from the flow passage portion;
an adjustment portion configured to adjust an amount of the gas flowing through the flow passages,
wherein a number of the gas flow-in ports is different from a number of the gas flow-out ports,
wherein the adjustment portion comprises a first auxiliary flow passage formed between opposed surfaces of the power generation cells arranged such that the power generation cells are opposed to each other on a same plane,
wherein the adjustment portion is configured to reduce variation in a flow among the flow passages by adjusting a pressure loss in the flow passage portion formed between the gas flow-in ports or between the gas flow-out ports.

10. A method of controlling a fuel cell unit structure which generates power by supplying gas to power generation cells sandwiched between separators while supplying the gas from gas flow-in ports to a flow passage portion formed in the separators and discharging the gas from gas flow-out ports, the method comprising:
dividing in a same plane of the power generation cells a flow of the gas supplied from the gas flow-in ports into at least two flows including a main flow flowing through the flow passage portion in the separators and an auxiliary flow flowing between the power generation cells arranged to be opposed to each other on the same plane with a gas flow-in port of the gas flow-in ports being located on an extended line of a flowing direction of the auxiliary flow; and adjusting a pressure loss of the gas in the auxiliary flow to cause the gas to be evenly distributed in the same plane in the main flow.

11. A method of controlling a fuel cell unit structure which generates power by supplying gas to power generation cells sandwiched between separators while supplying the gas from gas flow-in ports to a flow passage portion formed in the separators and discharging the gas from gas flow-out ports, wherein a number of the gas flow-in ports is different from a number of the gas flow-out ports, the method comprising:
dividing in a same plane of the power generation cells a flow of the gas supplied from the gas flow-in ports into at least two flows including a main flow flowing through the flow passage portion in the separators and an auxiliary flow flowing between the power generation cells arranged such that the power generation cells are opposed to each other on the same plane; and adjusting a pressure loss of the gas in the auxiliary flow to cause the gas to be evenly distributed in the same plane in the main flow.

* * * * *